US005606795A

United States Patent [19]

Ohba et al.

[11] Patent Number: 5,606,795

[45] Date of Patent: Mar. 4, 1997

[54] METHOD FOR MANUFACTURING A WIRING HARNESS USING A SET OF ELECTRIC WIRES THEREFOR

[75] Inventors: Osamu Ohba; Yoshikazu Yamamoto; Koichiro Matsunaga; Takayuki Tsuchiya; Toshihiro Nakahama, all of Shizuoka, Japan

[73] Assignee: Yazaki Corporation, Tokyo, Japan

[21] Appl. No.: 160,292

[22] Filed: Nov. 30, 1993

[30] Foreign Application Priority Data

| | | | |
|---|---|---|---|
| Dec. 4, 1992 | [JP] | Japan | 4-325240 |
| Jul. 21, 1993 | [JP] | Japan | 5-180201 |

[51] Int. Cl.$^6$ .......... H01R 43/04; B23P 19/00

[52] U.S. Cl. .......... 29/863; 29/872; 29/760; 29/759

[58] Field of Search .......... 29/863, 872, 742, 29/755, 760, 564.1, 564.4, 753, 759; 269/903

[56] References Cited

U.S. PATENT DOCUMENTS

| | | | |
|---|---|---|---|
| 5,082,253 | 1/1992 | Suzuki | 269/45 |
| 5,127,159 | 7/1992 | Kudo | 29/863 |
| 5,205,329 | 4/1993 | Suzuki | 140/92.1 |

FOREIGN PATENT DOCUMENTS

| | | |
|---|---|---|
| 60-119090 | 6/1985 | Japan . |
| 61-29090 | 7/1986 | Japan . |
| 647468 | 2/1989 | Japan . |
| 1-132009 | 5/1989 | Japan . |
| 1-313872 | 12/1989 | Japan . |
| 3-66790 | 10/1991 | Japan . |

*Primary Examiner*—P. W. Echols
*Attorney, Agent, or Firm*—Armstrong, Westerman, Hattori, McLeland & Naughton

[57] ABSTRACT

A method of manufacturing a wiring harness including the steps of making plural kinds of electric wires each having a predetermined length for each kind in lots each having several tens to several hundreds wires, the plural kinds of wires constituting a wiring harness and including terminal-equipped wires with one or both ends connected with a terminal and terminal-free wires with both ends connected to no terminal; temporarily holding groups of wires thus made in predetermined wire holders in the order of lots; and wire arrangement accomplished by forming a set of wires for the wiring harness with the groups of wires constituting the wiring harness intensively hung on one or more wire clamps in such a manner that one wire w1 is taken out from the wire holder H1 to lock its one or both ends to predetermined one or two wire clips of the wire clamp provided with plural wire clips, and subsequently, the wires (w2, w3, . . .) are taken out in order one-by-one from each of the wire holders (H2, H3, . . .) to be locked to other wire clips. Thus, loss from the process of making predetermined length wires to the process of terminal insertion is eliminated, and the product of wiring harness having the quality equivalent to that manufactured by an automation device can be obtained.

25 Claims, 19 Drawing Sheets

F I G. 4A
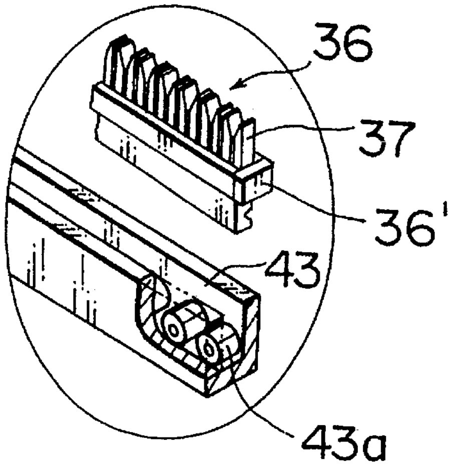
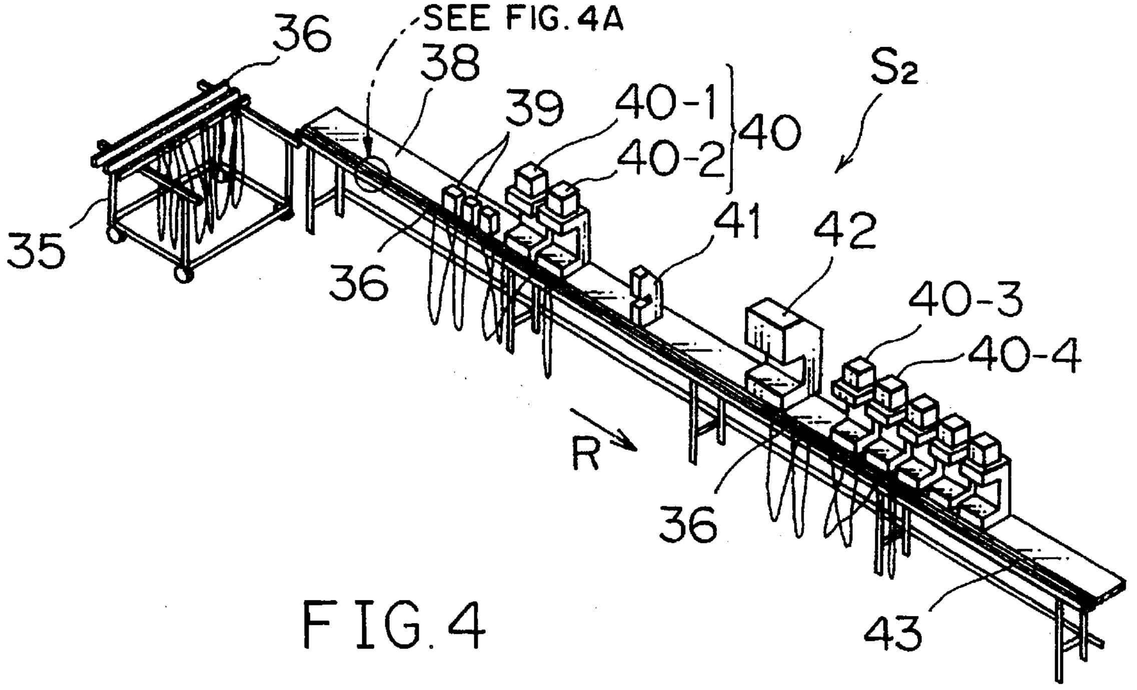
FIG. 4

METHOD FOR MANUFACTURING A WIRING HARNESS USING A SET OF ELECTRIC WIRES THEREFOR

BACKGROUND OF THE INVENTION

1. Field of the Invention

The present invention relates to a method and apparatus for manufacturing a wiring harness using at least one set of wires (hereinafter referred to as "wiring harness set"), which can greatly reduce the lead time and production cost in the manufacturing process and can provide wiring harnesses with uniform quality.

2. Description of the Related Art

Generally, motor vehicles, including both standard and luxury motor vehicles require several hundreds or more than one thousand of separate electric wires (hereinafter referred to as simply "wires"). Much labor and time is required to manufacture a wiring harness including such a large number of wires.

FIG. 15 shows an example of the arrangement of wiring harnesses (hereinafter, also referred to as simply "harness"). The complete format of wiring harnesses for a motor vehicle includes plural harnesses formed respectively for electric parts arranged on the vehicle, e.g. an engine room harness WE, a cowl side harness WC, an instrument panel harness WI, a door harness WD, a rear side harness WR, etc. Reference symbols J1, J2, J3, . . . denote junction blocks for connecting the harnesses to each other, and the reference symbol G denotes one of a plurality of grommets for protecting (sound-proofing, water-proofing and dust-proofing) the harnesses penetrating through a panel portion such as a dashboard.

As shown in FIG. 16, each harness is composed of a trunk WO and plural branches W1, W2, W3, . . . . The terminal of each branch is connected to connectors C1, C2, C3, . . . through which the harnesses are connected to each other and to several kinds of electric devices.

The harness composed of the trunk WO and the branches W1, W2, W3, . . . includes a large number of wires. These wires include a great variety of wirings with different marks or identifiers such as different wiring diameters (standard), lengths, colors of the insulating cover and characters, symbols and stripes shown on the insulating cover. One or both ends of each wire, as shown in FIGS. 17 and 18, are connected with a crimping terminal TO and pressure welding (bonding) terminal T1. The pressing terminal includes a great number of terminals t1, t2, t3, . . . corresponding to the standards of wires and/or shapes of partner terminals. Some of the branches W1, W2, W3 . . . , as shown in FIG. 20, include wires wl, wm, and wn simply bent from the trunk WO and extracted, and separate wires wr, ws, and wt extracted from joint terminals T2 located on the trunk wires by joint (branch connection). The manner of joint includes double pressing, as shown in FIG. 19, in which two or more wires wu and wv are connected to one pressure-connection terminal t1.

With respect to the wiring harness or a great variety of wires constituting the harness, many methods and apparatuses have been proposed to automate all the processes involved from the process of cutting the wires so as to have predetermined lengths and pressure connecting the corresponding terminals thereto to the process of terminal insertion which includes mounting a connector housing to a wire end for each of the branches. (Japanese Patent Laid-Open No. 60 (Showa)-119090 and Japanese Patent Laid-Open 1 (Heisei)-313872).

However, the introduction of an automation apparatus requires a vast amount of equipment cost, and the kinds of the terminals which can be pressed by a single apparatus are limited. In addition, the fabrication of the above branch portions include processes requiring complicated processing such as the branch connection using the joint terminals T2 and double pressing. For this reason, automation of the entire process of manufacturing a wiring harness is difficult. Under the present situations, the conventional manufacturing process combines many manufacturing processes according to a batch system with only the process of making some predetermined length wires being automated.

FIG. 21 is a block diagram for explaining the process for manufacturing a wiring harness according to the conventional batch system.

The entire manufacturing process includes the processes of making predetermined length wires, classification, succeeding classification, single pressing, double pressing, joint pressing, soldering, insulation-covering, completion of preparation, terminal insertion and final processing.

(Predetermined wire length)

In this process, wires are cut to predetermined lengths, and terminal-equipped wires with one or both ends connected to a standard terminal are made. This process is performed by one or more apparatuses having means for supplying electric wires, measuring their lengths, cutting, stripping, (removal of an insulation - cover), terminal-connection and transportation. The above electric wires include terminal-free electric wires having ends with no terminals. In this process, a wide variety of electric wires having different wire diameters and lengths are made according to their class in lots (L1, L2, L3, . . .) of several tens and hundreds. Such electric wires having predetermined lengths can be made using an apparatus having well-known arrangements (Japanese Patent Publication Nos. 61-29090, 64-7468 and 3-66790).

(Classification)

In this process, the appearance of each of the lots thus made (L1, L2, L3, . . .) is examined. The wires of the lot examined are classified according to various criteria, e.g., customer, vehicle type, factory, agency, etc. In accordance with the order of making, the wires are housed or laid out to predetermined cases or wires and ordered there.

(Succeeding Classification)

The wires of each lot classified according to the agency, for example, are further classified according to the succeeding process or machine for end processing. As in the previous process, the wires classified are housed in predetermined cases or are hung in wire hangers and ordered there.

(Single Crimp)

In this process, a non-standard or a terminal having a peculiar size is crimped onto the above terminal-free electric wire or an electric wire having only one end equipped with a terminal. Namely, in this process it is difficult to apply the above apparatus of making predetermined length wires.

(Double Crimp)

In this process, a single terminal is crimped onto one end, and aligned with the terminal-free electric wires or the one end terminal equipped electric wires. The terminal used for the double crimp, as in the above single crimp, in a non-standard terminal and has a peculiar size and to which it is difficult to apply the above apparatus for making predetermined length wires, and is separately crimped. The double press is a kind of joint crimp.

(Joint Crimp)

In this process, one terminal is branch-connected to a middle or end portion of one electric wire using a joint terminal. This process reduces the number of wires used for the wiring harness, thereby reducing the volume and weight of the harness. In this process non-standard joint terminal is used so that it is difficult to apply the above apparatus for making predetermined length wires to this process. The electric wire(s) subjected to the single crimp operation or double crimp operation can be used for the joint crimp operation, as shown in FIG. 21.

(Soldering)

In this process, soldering is performed to stabilize the branch connection portion made using the joint terminal and the electrical connection portion of the terminal.

(Insulation-covering)

In this process, the above soldered portion is insulated for protection in such a manner that it is bound with an insulating tape such as a vinyl tape, applied with a one-side adhesive sheet, or mold-shaped.

(Completion of Preparation)

In this process, the complete terminal-equipped electric wire is taken out one-by-one or set-by-set, from each of the lots in which the above end processing has been completed to gather a group of wires constituting one wiring harness. One or plural sets of wires are made for each wiring harness.

(Terminal Insertion)

In this process, a group of terminals at the ends of the set of wires are inserted and locked one-by-one for each of the branches in predetermined terminal chambers of a predetermined connector housing.

(Final Process)

In this process, the set of wires thus inserted into terminals is spread on a wiring harness board and arranged according to the actual wiring format of the wiring harness. In this case, the group of wires are collectively protected by tape binding, for example, with a wire protector attached to a suitable portion (e.g., branching portions of the trunks and branches of the wires). The grommet G (FIG. 15) is mounted on the main part of the harness. The completed set of wires, after being subjected to a conduction check for each wire, presence or absence of damage in the connector housing, etc., can then be supplied to vehicle maker for use.

FIG. 22 shows the manner of actual processing to be performed in each of processes for the wires with their ends not processed (This processing will be referred to as "main process").

In the process of making predetermined length wires, in each of lots (L1, L2, L3, L4, L5, . . .), wires wl, w2–w6 necessary for a circuit at issue are made. The wire wl is equipped with both end terminals; the wires w2, w3, w5 and w6 are equipped with one end terminal, respectively, and wire w4 is equipped with no terminal. Symbols ○, Δ, □, ◇ denote standard terminals which are prepared in the apparatus for performing this process.

The both-end-terminals equipped wire wl can be transferred to the process of completion of preparation. With respect to the one-end-terminal equipped w2, in the process of single pressing a different terminal ▲ is pressed to the remaining end of the wire to form a both-end-terminals equipped wire. For the wires w3 and w4, in the process of double pressing a different terminal ▼ is pressed to each of their ends.

The wires w5 and w6 are jointed to the remaining end of one (w4) of the wires w3 and w4 subjected to the double pressure connection. Subsequently, the joint portion is soldered in the process of soldering, and bound with tape in the process of insulation-covering. Likewise, the wires included in the remaining lots are subjected to necessary end processing. Finally, in the process of completion of preparation, the both-end-terminal equipped electric wires wl and w2 and the joint wire w3-w4-w5-w6 are taken out one by one from each lot to assemble the set of wires.

FIGS. 23A and 23B are flow charts of the details of work in the processes of making predetermined length wires and single pressing.

Specifically, in FIG. 23A, after the processing of supplying the electric wires, measuring their length, cutting, stripping and standard terminal pressing has been completed, the wires are bundled for each lot using a rubber band. Thereafter, the bundles are curled to have a suitable size. Each curl is attached with a tag on which a product number, the number of wires and length thereof, the standard of the terminals pressed, a destination, etc. are described. The curls are hung on a wire hanger and placed in order. The wire hanger is carried to a predetermined stock position. It is stocked until the process of classification (FIG. 21).

In FIG. 23B, the group of electric wires in the lot after the classification has been completed are taken down from the wire hanger. The bundles are undone. The objects (wires) to be processed are subjected to the single crimp operation. These objects are bundled again, hung on the wire hanger and stored in the same manner as described above. Further, before the processing is advanced to the processes of double crimping, joint crimping or completion of preparation, it is confirmed whether or not there are predetermined terminals and damaged terminals. The group of wires are carried, hung on the wire hanger again and stocked.

The conventional batch system, as shown in FIG. 23A, requires, in addition to the processing of making predetermined length electric wires, many working man-hours including bundling, curling, tagging, hanging, wire hanger-carrying, etc. The single crimping as shown in FIG. 23A requires the taking down of the wire hangers, bundle-undoing before the processing, and requires, after the processing, more working man-hours composed of the bundling, hanging, stocking, confirming, classifying according to process/machine, wire carrying and wire hanger-carrying. This situation also applies in the processes of double crimping, joint crimping, soldering and insulation-covering.

Thus, the method of manufacturing a wiring harness according to the conventional batch system has the following problems to be solved:

1. Many operations, including predetermined length wire making to terminal insertion, associated with the pressing process must be repeated with each pressing process, results in great wasteful effort.

2. There is a time delay due to stocking between the adjacent processes from the process of predetermined length wire making to the process of terminal insertion. So, this requires a vast stocking space, and also results in a long lead time from the making of the predetermined length wire to the terminal insertion including the accompanying operations.

3. Each of the processes, from the making of the predetermined length wire to the terminal insertion, is an individual operation so that there is less correlation among the processes. Therefore, it takes a long time for workers to understand the entire process and master it.

4. An operation, such as wire hanger carrying, must be performed whenever one process is shifted to the succeeding process. For this reason, inferior goods resulting from tangling of the terminals crimped and stamping by the wire hanger may be made for each lot.

5. Some inferior goods are inevitably generated in the processes of single press, double press processing and joint press after the process of making predetermined length wires. In this case, the percentage of inferior goods is different for each process. A correct number of wires cannot be prepared for the set of wires which are formed by collecting the processed wires from each lot. In order to compensate for the shortage, a redundant number of wires must be prepared for each lot.

6. Out of the set of wires prepared, it is not easy to discriminate those lots having either a surplus or shortage in the number of wires. Since there are a great number of terminals and connector housings, in the process of terminal insertion, false insertion of the terminals is inevitable.

7. Because of the existence of the above problems, in the entire conventional batch system, it is difficult to assure the wiring harness with stable quality equal to when an automated device is used.

SUMMARY OF THE INVENTION

The present invention is directed toward solving the above problems.

An object of the present invention is to provide a method and apparatus for manufacturing a wiring harness using a set of wires therefor, which can simplify the operation in each of the processes so that workers can easily master the operation, thus enabling stable production of the wiring harnesses.

Another object of the present invention is to provide a method and apparatus for manufacturing a wiring harness using a wiring harness set, which can easily allow the quality of the products or semi-products in each process to be inspected visually.

Still another object of the present invention is to provide a method and apparatus for manufacturing a wiring harness using a wiring harness set, which can reduce the loss between the adjacent processes thereby to shorten the whole lead time, thus enhancing profit and reducing production cost.

A further object of the present invention is to provide a method and apparatus for manufacturing a wiring harness using a wiring harness set, which has versatility in easily dealing with changes in models and grades of cars.

A still further object of the present invention is to provide a method and apparatus for manufacturing a wiring harness using a wiring harness set, which can produce wiring harnesses with quality equal to the product manufactured by an automated device.

In order to achieve the above objects, in accordance with the present invention, there is provided a method of manufacturing a wiring harness using a wiring harness set, comprising the processes of:

1) making plural kinds of electric wires each having a predetermined length (w1, w2, w3, . . .) for each kind of lots (L1, L2, L3, . . .) each having several tens to several hundreds of wires, the plural kinds of wires constituting a wiring harness and including terminal-equipped wires with one or both ends connected with a terminal(s) and terminal-free wires with both ends connected to no terminal;

2) temporarily holding groups of wires thus made (L1, L2, L3, . . .) in predetermined wire holders (H1, H2, H3, . . .) in the order of lots; and 3) wire arrangement accomplished by forming a set of wires for the wiring harness with the groups of wires constituting the wiring harness laid out on one or more wire clamps in such a manner that one wire wl is taken out from the wire holder H1 to lock one or both its ends to predetermined one or two wire clips of the wire clamp provided with plural wire clips, and subsequently, the wires (w2, w3, . . .) are taken out in order one-by-one from each of the wire holders (H2, H3, . . .) to lock its one or both ends to one or two wire clips separately provided, or further lock its one end to the wire clip with the wire locked.

The wiring harness set made by the wire arrangement process is shifted to a predetermined end processing station. In this station, the wiring harness set is subjected to:

4) wire end processing in which the remaining one-end terminal equipped wires or terminal-free wires are subjected to the desired end processing such as terminal crimping and joint crimping, and after the processing, their wire ends are returned to the original wire clipping positions and locked there.

The desired end processing comprises a part or whole of the following steps of:

a) rubber stopper setting accomplished by successively taking out wires selected from a group of wires with their one or both ends with no terminal in the wiring harness set and setting each wire end into a water proof rubber stopper;

b) tube insertion accomplished by successively taking out wires selected from another group of wires with their one end or both ends with no terminal in the wiring harness set and inserting the end of one or plural wires into a protecting tube;

c) terminal connection accomplished by successively taking out wires with their one or both ends with no terminal inclusive of the wires mounted into the rubber stopper or tube and fixedly connecting the wires to predetermined terminals;

d) terminal double connection accomplished by successively taking out, from the wiring harness set, two or more wires with no terminal doubly locked to the wiring clip and doubly fixedly connecting the two or more wires to predetermined terminals;

e) joint connection accomplished by successively taking out, from the wiring harness set, a set of wires with their one end with no terminal and other wires and connecting, in a branching manner, the middle or end portion of each of the other wires to each of the wires with their one end with no terminal;

f) soldering accomplished by successively taking out, from the wiring harness set, the joint-connected or terminal-equipped wires and soldering the joint-connected portion or the terminal-wire connected portion; and g) insulation-covering accomplished by protecting the soldered portion by binding the soldered portion with an insulating tape.

The wire end processing includes the following processes:

5) terminal insertion accomplished by detaching the wire ends in a predetermined order from the wiring harness set subjected to the wire end processing to insert the fixedly connected terminals into terminal chambers of the first connector housing and repeating the operation of inserting the terminals into the second, third . . . connector housings;

6) combination of wiring harness sets accomplished by combining plural sets of wires subjected to the terminal insertion to prepare almost all wires necessary for a single wiring harness; and 7) final processing by two-dimensionally arranging the combined plural wiring harness sets so as to accord with the wiring format of the wiring harness on a wiring harness board and performing the final process operations inclusive of wire-gathering, branching, tape binding, wire protector attaching and grommet mounting.

The apparatus for manufacturing a wiring harness according to the present invention is characterized by a device for automatically arranging wires composed of a wire-arrangement operation table having means for fixing a wire clamp, a wire insertion chuck which can be moved vertically and horizontally for the table and has a pair of wire chucking plates which can be opened or closed, and a wire setting stand having an escaping groove of the wire insertion chuck for the wiring chucking plate and a groove for placing wires thereon.

In accordance with the method of manufacturing a wiring harness, the predetermined length wires for each of lots (L1, L2, L3, . . .) are temporarily held in the order of manufacturing in predetermined wire holders (H1, H2, H3, . . .) and thus automatically classified for preparation of the subsequent wire arrangement process.

When necessary lots have been prepared, in the above wire arrangement process, a single wire wl is taken out from the first holder H1, and one or both of its ends are locked to a predetermined clip of the wire clamp. Succeedingly, the wires (w2, w3, . . .) are taken out one by one from the each of the holders (H2, H3, . . .), and locked to another wire clip or doubly locked to the wire clip already locked.

Thus, a wiring harness set with a group of wires constituting the wiring harness laid out on the wire clamp is formed.

With respect to such a wiring harness set, an operator can recognize in the subsequent process whether or not the wires have been locked to a predetermined wire clip. The operator can easily visually monitor the wires.

As seen from FIG. 21 showing the prior art, the conventional classification and another classification succeeding it can be replaced by the temporary holding by a holder and a wire arrangement process according to the present invention, respectively. Further, the temporary holding corresponding to the conventional classification, e.g., the order of the wire holders in which wires are held, is predetermined, and further, the product number and other necessary matters have only to be previously inscribed on the holders. For this reason, the operations such as bundling, curling and tagging attendant to the conventional process of making predetermined electric wires are not required (see FIG. 23).

The further advantageous function and benefit of the above wiring harness set can be found in the wire end processing in which the wiring harness set is shifted to a predetermined end processing station and the remaining one-end terminal equipped or terminal-free wires are subjected to the desired end processing such as the terminal crimping, joint crimping, etc.

Specifically, since the one-end terminal equipped and terminal-free wires other than the both-end terminal equipped wires are locked to the above wiring harness set, the ends must be processed. The end processing includes several kinds of processing such as rubber stopper setting, tube setting, terminal connecting, double terminal connecting, jointing, soldering and tape binding. All of these operations can be performed within the end processing station in such a manner that the wiring harness set is moved from one end to the other end.

As a result, the operations typically required before and after the conventional processes of single crimping, double pressing, joint pressing, soldering and insulation covering, i.e., many operations inclusive of wire hanger taking-down, bundle undoing, bundling, stocking, confirming, classifying according to process and machine, wire carrying and wire hanging, are not required. Further, time delay due to the stocking which is a main cause of lengthening the leading time, can be canceled.

The terminal insertion process can be carried out later by moving the wiring harness set composed of wires subjected to the terminal processing to the final end of the end processing station.

The assembled wiring harness set can be combined with another kind of wiring harness set as necessity requires, and the combined harness set is shifted to the final process where the same processing is performed for the set resulting in a finished product.

Further, programming can be performed so that when both ends or one end is placed on a wire setting stand after the wiring clamps are fixed on the arrangement operation table, the wire insertion chucks successively lock the wires to the wire clips of the wire clamp in a predetermined order. The apparatus for manufacturing a wiring harness according to the present invention, therefore, can manufacture a wiring harness set with no false wiring and with uniform quality.

The above and other objects and features of the present invention will be more apparent from the following description of preferred embodiments taken in conjunction with the accompanying drawings.

BRIEF DESCRIPTION OF THE DRAWINGS

FIG. 4 is a schematic perspective view of an end processing station used to manufacture a wiring harness according to the present invention;

FIG. 4A is an enlarged view of a guide rail shown in FIG. 4.

DESCRIPTION OF THE PREFERRED EMBODIMENTS

Figure 1:
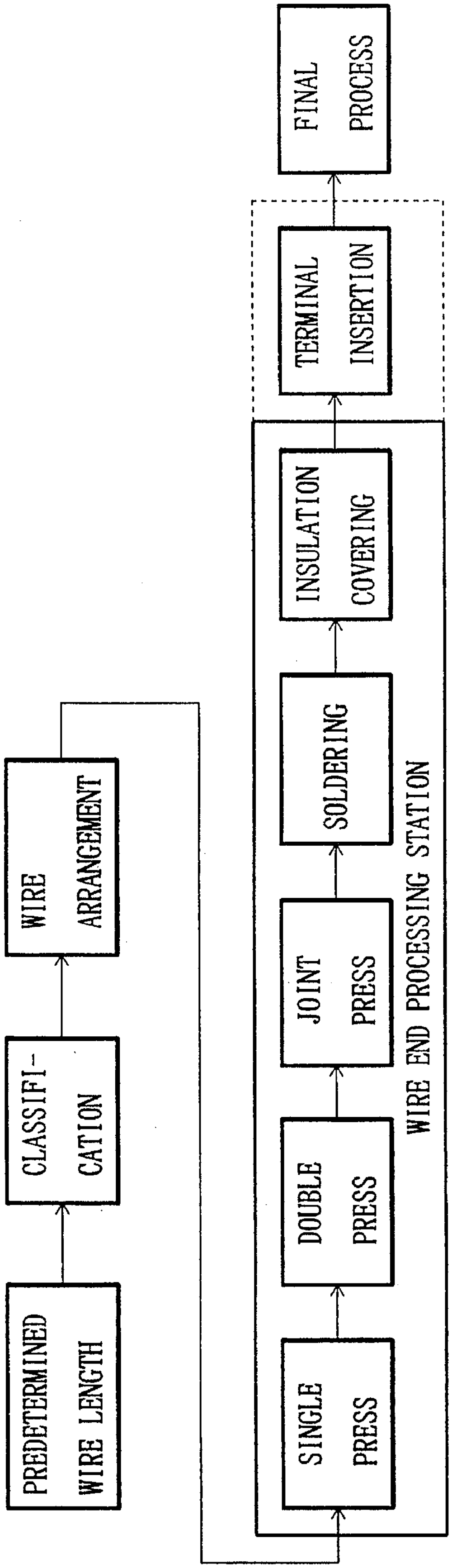
FIG. 1 is a block diagram explaining the process of manufacturing a wiring harness according to the present invention.

Now referring to the drawings, an explanation will be given of embodiments of the present invention.

FIG. 1 shows the entire process for manufacturing a wiring harness according to the present invention.

Figure 21:
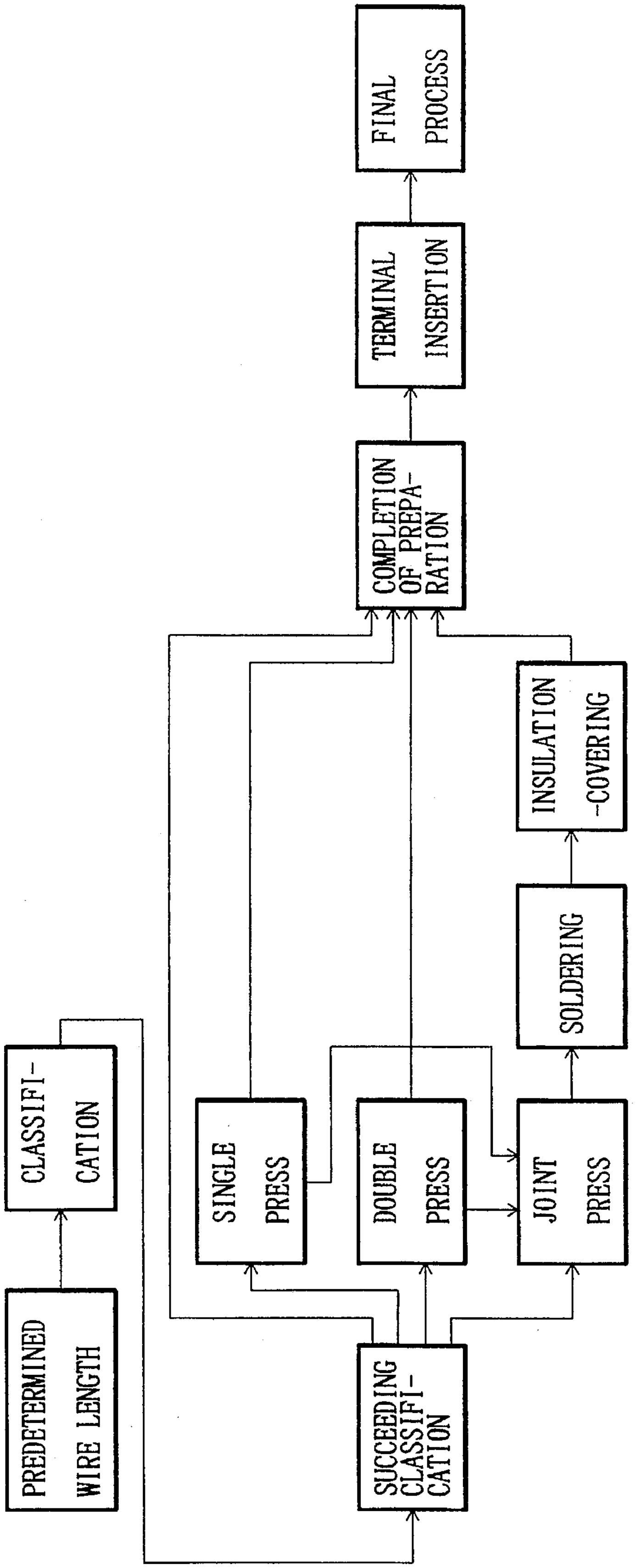
FIG. 21 PRIOR ART
FIG. 21 is a block diagram for explaining the conventional wiring harness manufacturing process.

In FIG. 1, the meanings of the processes of "making predetermined length wires", "single crimping", "double pressing", "joint crimping", "soldering", "tape binding" and "terminal insertion", i.e., the contents of processing are the same as in the conventional manufacturing process of FIG. 21. So they will not be explained in detail here. The processes of classification and wire arrangement according to the present invention have been described above.

As is apparent from the comparison of FIG. 1 with FIG. 21, a substantial difference between FIG. 1 and FIG. 21 resides in that in the present invention, the processes of the wire end processing such as the single crimping and tape binding, and the terminal insertion can be performed in a single end processing station whereas in the prior art, these processes are individual and each of the processes is accompanied by many operations other than the wire end processing and stocking.

Figure 2:
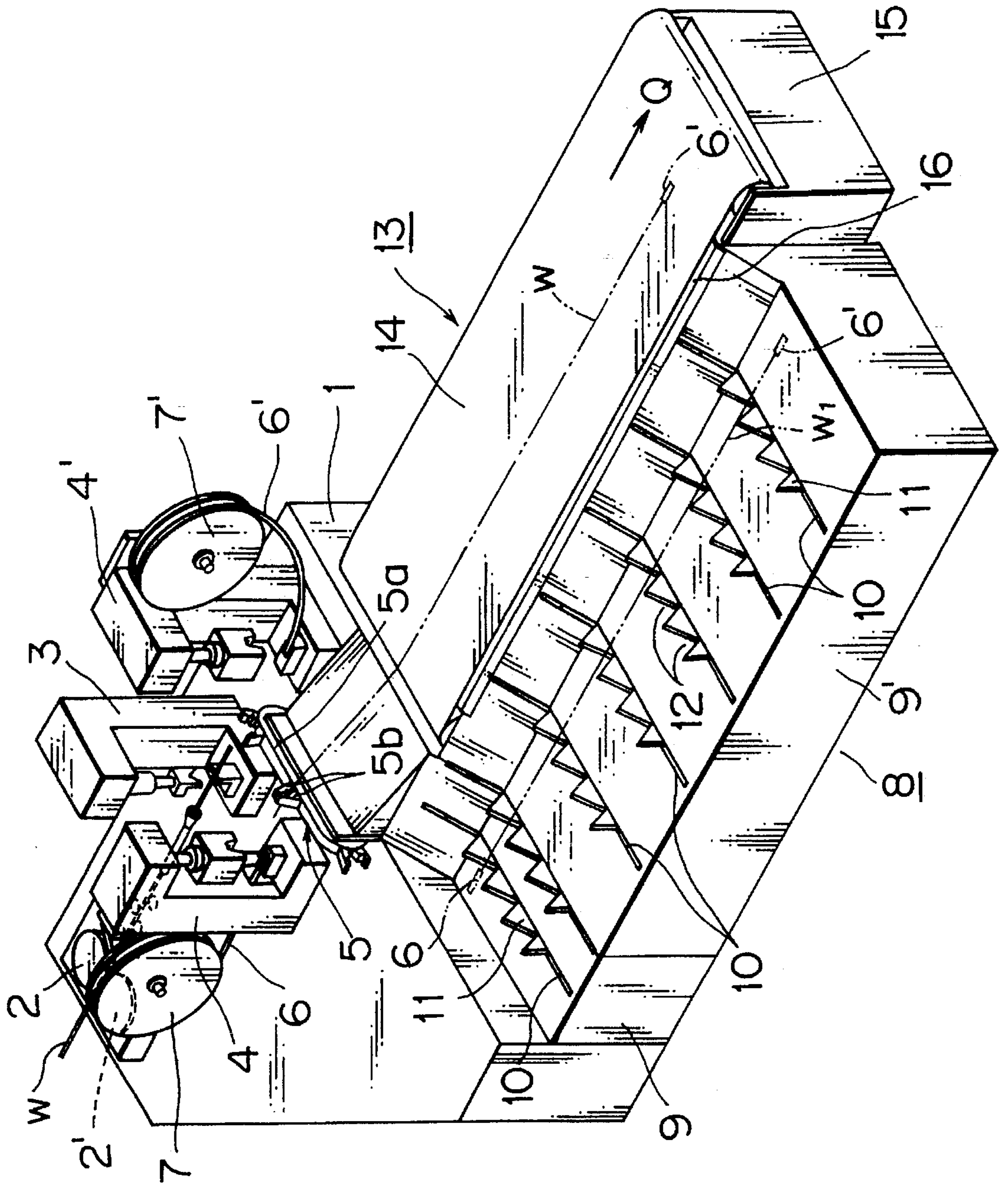
FIG. 2 is a perspective view of the apparatus used to make predetermined length electric wires according to the present invention.

FIG. 2 shows, in a perspective view, an apparatus for fabricating terminal-equipped wires used in the process of making predetermined wires according to the present invention, as disclosed in Japanese Patent Application No. 4-243121.

In FIG. 2, reference numeral 1 denotes a stand; 2, 2' a roller for supplying a length-detected wire which constitutes a wire supplying device; 3 a device for cutting and stripping the wire; 4, 4' a terminal pressing device; and 5 a wire carrying device. The carrying device 5 has carrying portions provided at regular intervals on an endless chain 5*a*. Reference numeral 6, 6' denotes a chainlike terminal; and 7, 7' a terminal reel. Reference numeral 8 denotes a plural lot classifying device composed of a saucer 9 on which predetermined shorter length wires are placed and saucer 9' on which predetermined longer-length wires are placed. Each saucer is provided with wire carriers 11 each having plural lot classifying grooves 12 through transversal slits 10; the carriers 11 can move vertically and horizontally. Reference numeral 13 denotes a conveyer device which is composed of a belt conveyer 14 and a stand 15 for supporting it; a wire drawing-in preventing cover 16 is provided between the saucer 9' and the conveyer device 13.

Taking a longer wire as an example, an explanation will be given of the process for making both end terminal equipped wire wl.

The wire wl supplied from a wire supplying station (not shown) is cut and stripped on one end by the device 3, and the terminal 6' is pressed to the exposed conductor.

A predetermined length of the one-end-terminal equipped wire thus formed is detected and supplied by the rollers 2 and 2' and the conveyer device 13. The wire is grasped by portions 5*b*, 5*b* on the starting side of the carrying device 5, and cut and stripped on its other end by the device 3 again.

The one-end terminal equipped wire w is carried in front of the terminal press device 4 by intermittent shift of the carrying chain 5*a*, and the terminal 6 is pressure-connected to the exposed conductor at the other end. Thus, the both-end-terminal equipped wire is formed.

The both-end terminal equipped wire wl is further intermittently carried by the carrying chain 5*a*, and released from the grasping portions 5*b*, 5*b* on the on the ending side of the device 5. The wire wl is temporarily stocked in the saucers 9 and 9'. Incidentally, when the wire wl is carried, because of the rotation of the belt conveyer 14 in an arrow Q direction, the wire wl also suffers from a stretching force in the same direction. The wire wl is, therefore, shifted in parallel along with the movement of the carrying chain 5*a*.

Thus, when a predetermined number of both-end-terminal equipped wires wl, i.e. one lot L1 of the wires wl are completed, the above wire carriers 11 are shifted leftward in FIG. 2 by one pitch (equal to the width of the lot classifying groove 12), lowered there, shifted rightward and then raised to the initial position. Because of repetition of such a rotation, plural lots of wires are temporarily stocked in the saucers 9 and 9'.

The above description has been directed to an example of making the predetermined length longer both-end-terminal equipped wires. In the case where predetermined length shorter both-end-terminal equipped wires are to be made, it is not necessary to use the saucer 9' and the conveyer 13. Using the same apparatus, predetermined length wires each equipped with a one-end-terminal and no terminal can be made. It is needless to say that in accordance with the number of lots, a plurality of apparatuses for fabricating terminal-equipped wires can be used.

Figure 3:
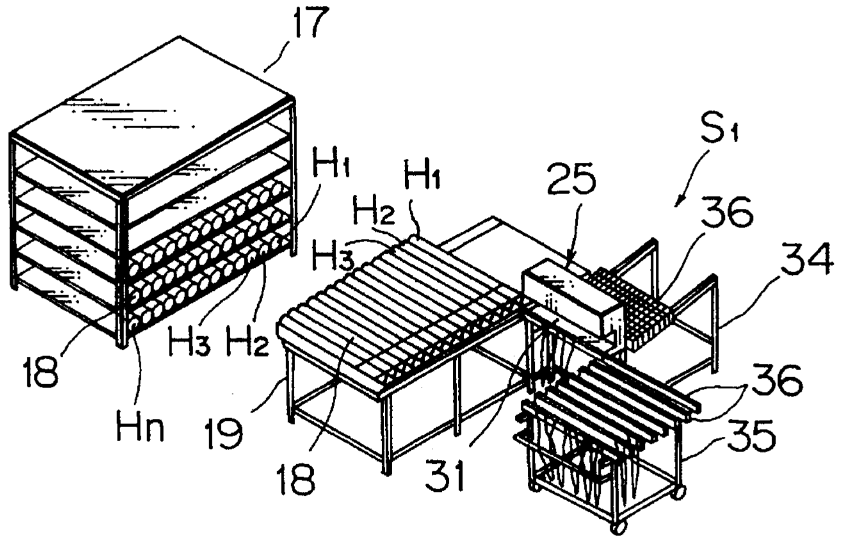
FIG. 3 is a schematic perspective view of a lot regulating rack and wire arrangement station which are used to manufacture a wiring harness according to the present invention.
Figure 5:
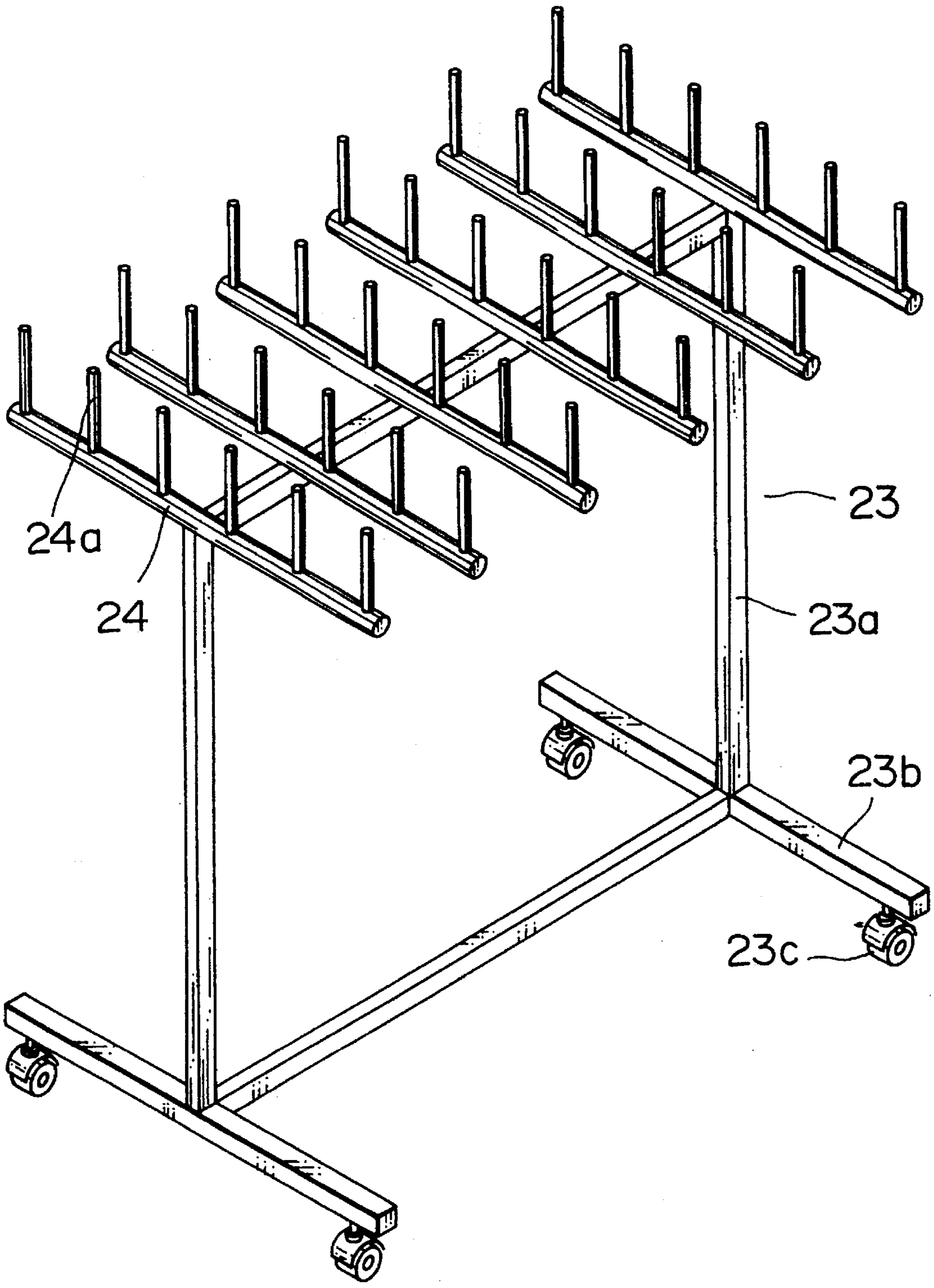
FIG. 5 is a perspective view of a wire holder (wire hanger) which is used after making predetermined length wires according to the present invention.
Figure 6:
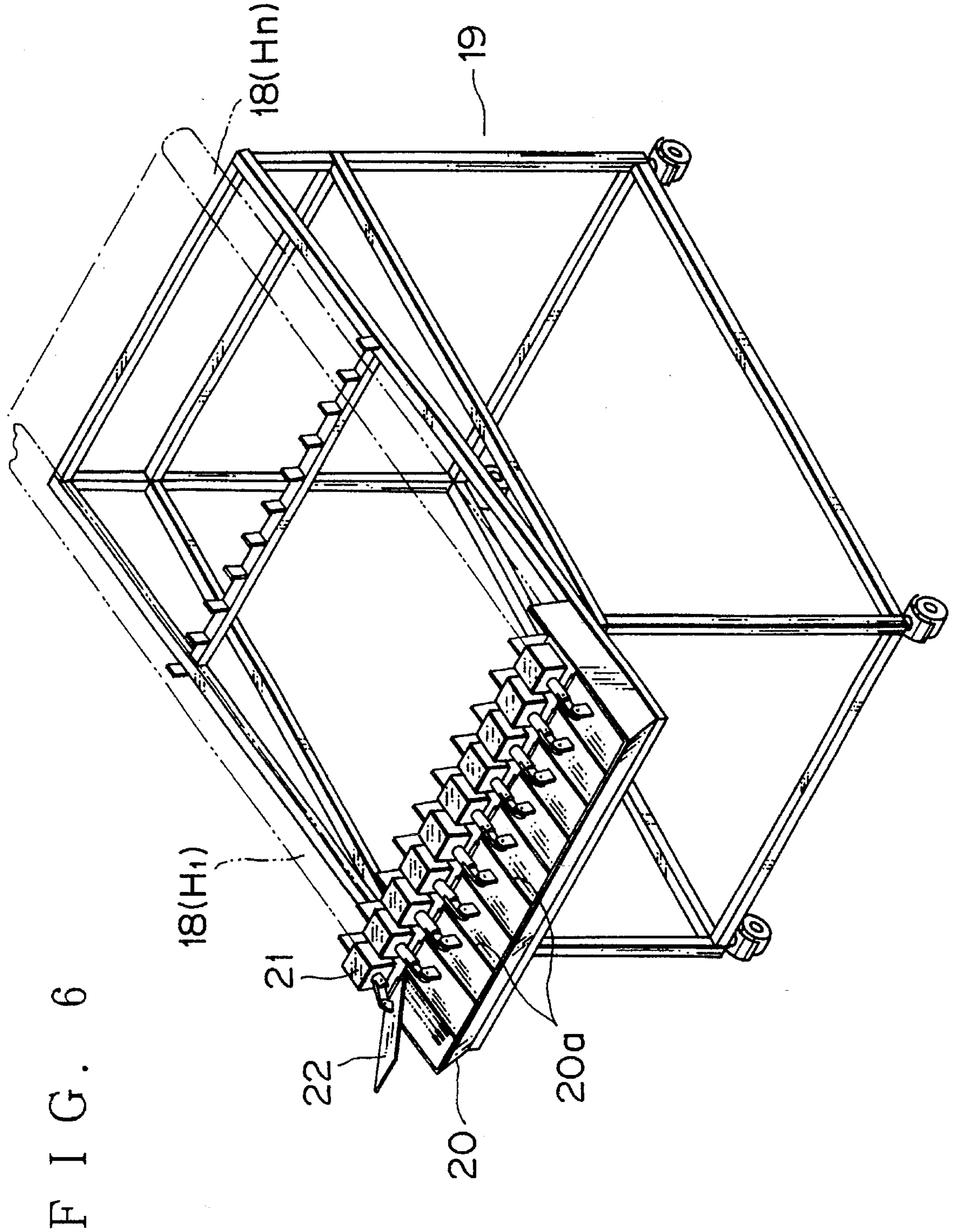
FIG. 6 is an enlarged perspective view of another wire holder shown in FIG. 3.

FIG. 3 shows, in a schematic perspective view, a lot regulating rack and wire arrangement station which are used to manufacture wire harnesses according to the present invention. FIG. 4 shows, in a schematic perspective view, an end processing station. FIG. 5 shows, in a schematic perspective view, a wire holder used in the process of classifying, i.e., temporary stocking according to the present invention. FIG. 6 shows, in an enlarged view, another wire holder of FIG. 3.

In FIGS. 3 and 4, symbol S1 denotes a wire arrangement station; and symbol S2 denotes an end processing station. The lot regulating rack 17 is provided in front of the wire arrangement station S1.

Each of stages of the lot regulating rack 17 is formed so as to be large enough so that the lot of wires constituting a single wiring harness can be placed correctly. A plurality of wire holders H1, H2, H3, . . . arranged in a predetermined order are stored in each stage. In the example shown, each wire holder is formed as a cylinder 18 made of synthetic resin. The wire holder will be also referred to as the cylinder 18.

In operation, the predetermined length wires (w1, w2, w3 . . .) of each of the lots (L1, L2, L3 . . .) made by a single or plural devices for making terminal-equipped wires as shown in FIG. 2 are housed and stocked in the cylinders 18 in the order of production lots.

The predetermined wires, as described above, include several kinds of wires such as both-end-terminal equipped wires, terminal-free wires, etc. and further include wires with different lengths, diameters, colors of insulating covers, or marks (characters, symbols, stripes, etc.) shown on the insulating covers. These wires are held or housed in the wire holders 18 in the order of production lots and the arrangement of the holders so that they are automatically classified.

If there are wires so long that they cannot be housed in the cylinder 18 of the above predetermined length wires (w1, w2, w3 . . .), such long wires are temporarily stocked in a wire setting truck 23 as shown in FIG. 5. In FIG. 5, reference numeral 23*a* denotes the frame body of the truck 23, and 23*b* denotes a leg equipped with casters 23*c*. On the top of the frame body 23*a*, wire hanging poles 24 each connected to plural partitioning rods 24*a* horizontally and parallel attached thereto are provided in parallel. The longer predetermined length wires are hung on the wire hanging poles 24 and prepared for the subsequent wire arrangement process.

In FIG. 3 again, in the wire arrangement station S1, reference numeral 25 denotes an automatic arrangement device and reference numeral 31 denotes an arrangement work table. On the left side of the table 31, a wire supplying rack 19 is arranged; on the right side thereof, a rod truck 35 is arranged; and on the back side thereof, an empty rod truck is arranged. To the wire supplying rack 19, a plurality of the cylinders 18 corresponding to one stage as they are exactly arranged in the order described above are shifted from the lot regulating rack 17. On the empty truck 34, a wire clamp 36 used for wire arrangement is mounted. On the rod truck 35, the wire clamp 36 already subjected to the wire arrangement is mounted.

As shown in FIG. 6, the wire supplying rack 19 is provided with a portion 20 for controlling the takeout of wires at its one end. The takeout controlling portion 20 is divided into cavities 20*a* into which the one end of each of the plurality of the cylinders 18 is inserted. Each cavity 20*a* is provided with a cap 22 which is opened or closed by a solenoid 21.

Figure 7:
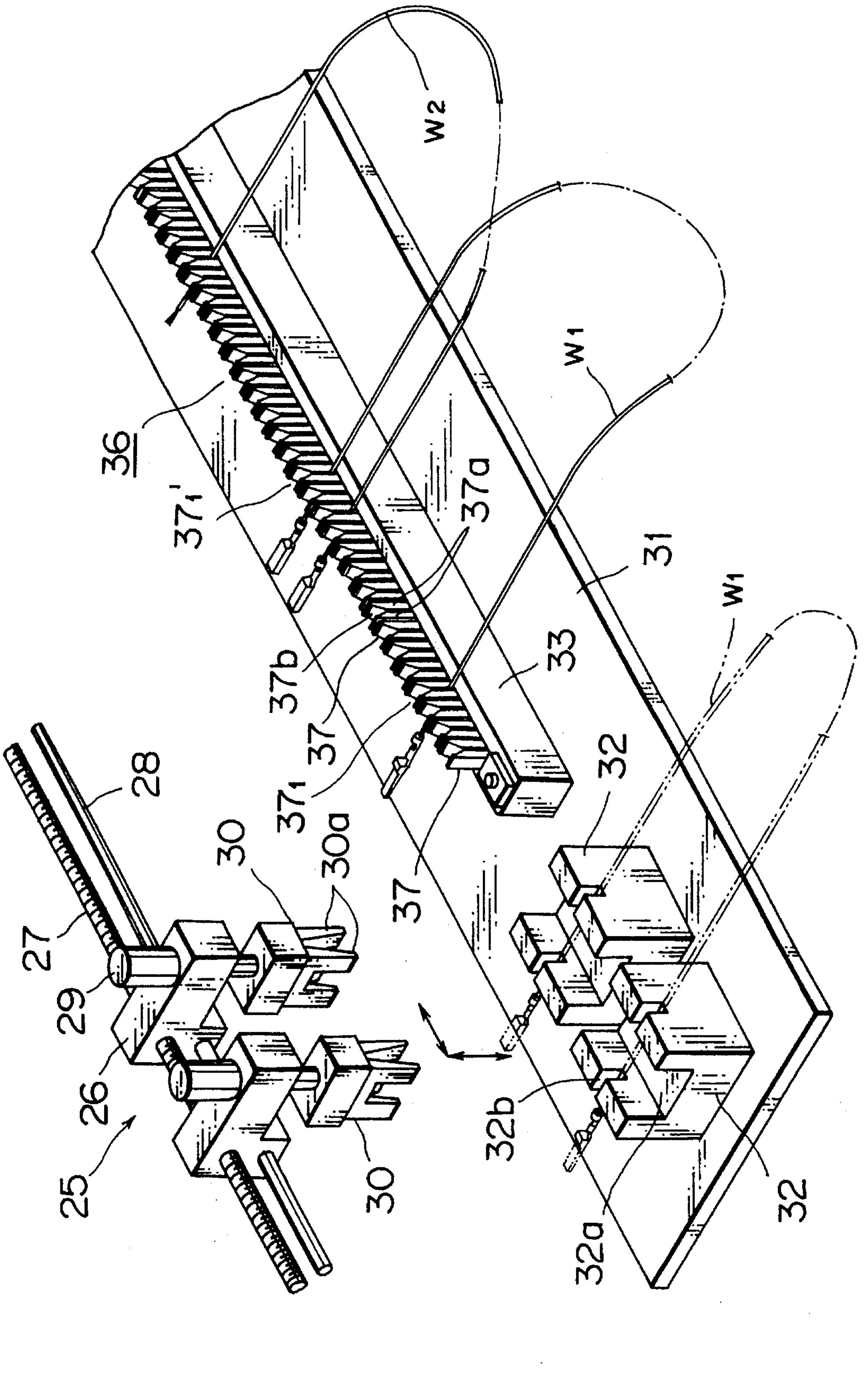
FIG. 7 is a perspective view of the working table used in the wire arrangement process according to the present invention.

As shown in FIG. 7, the automatic arrangement device 25 is provided with a pair of wire insertion chucks 30, 30 which can move vertically and horizontally. Each wire insertion chuck 30 is composed of a pair of wire chucking plates 30*a*, 30*a* which can be freely opened or shut. A head 26 to which the chucking plate 30 is attached is mounted to a screw rod 27 and a guide rod 28 which are in parallel to the longitudinal direction of the shooting work table 31. The wire insertion chuck 30 can move vertically because of the operation of an air cylinder 29 fixed to the head 26.

The operation of the pair of wire insertion chucks 30, 30 as well as the opening/shutting order of the caps 2 in the wire takeout control portion 20 of the wire supplying rack 19 can be controlled by an automatic control system (not shown) and previously programmed.

On the other hand, on the shooting operation table 31, at its one end (left in FIG. 7), wire setting stands 32, 32 are arranged in parallel correspondingly to the pair of wire insertion chucks 30, 30. Towards the other end from there, a rod setting stand 33 for positioning and fixing the wire clamp 36 is provided.

Each of the wire setting stands 32 is provided with an escaping groove 32*a* for the pair of wire chucking plates 30*a*, 30*a* and a groove 32*b* on which a wire is placed. The wire clamp 36 includes plural wire clips 37 supported and fixed in parallel at predetermined intervals by a linear supporting pole 36' (FIG. 4). Each wire clip 37 is composed of a pair of blades 37*a*, 37*a* each having a guide slope on its top end (see JP-A-1-132009 (Laid-Open). The supporting pole of the wire insertion chuck 36 may have an arc shape.

The wire arrangement process will be explained below.

In the wire arrangement station S1, as described above, the wire holders H1, H2, H3, H4, H5 in which predetermined length wires (w1, w2, w3 . . .) of each of the lots (L1, L2, L3, . . .) are prepared on the wire supplying rack 19 adjacent to the wire arrangement table 31. The one end of each holder is set in the takeout controlling portion 20 (FIGS. 3 and 6).

As seen from FIG. 6, a worker or operator takes out a both-end-terminal equipped wire wl from the wire holder H1 with the cap 22 opened, and as seen from FIG. 7, bends it in a U-shape and sets its both ends in the grooves 32*b*, 32*b* of the pair of wire setting stands 32, 32. Then, the wire insertion chucks 30, 30 fall so that the corresponding pair of chucking plates 30*a*, 30*a* pick up both ends of the wire and then rise. The wire chucking plates 30*a*, 30*a* are shifted on top of predetermined wire clips 37-1, 37-1' of the previously set wire clamp 36, fall to lock the wire wl and thereafter returned to the original position. Likewise, the predetermined wires w2, w3, . . . in the wire holders H2, H3, . . . are locked to predetermined wire clips 37.

In this way, the predetermined length wires (w1, w2, w3, . . .) in each of the lots (L1, L2, L3 . . .) are secured to a group of wire clips 37 of the single wire clamp 36 in accordance with a predetermined arrangement order. Thus, the wiring harness set corresponding to a single wiring harness is formed and stocked in the pole truck 35. It is needless to say that the wire arrangement processing is continued until a wiring harness set corresponding to the number of wires in each of the lots are completed.

As the case may be, each predetermined length wire may be secured in its one end. Further, the wires may be manually arranged without using the automatic wire arrangement apparatus 25. For preparation of double pressing, two predetermined length wires may be secured.

Referring to FIG. 4 again, reference numeral 38 denotes a working table for predetermined longer length wires. A plurality of wire-stripping machines 39, a terminal crimping machine 40 (40-1, 40-2), a joint crimping machine 41, a tape binding machine 42 and other terminal crimping machines (40-3, 40-4, . . .) are provided on the working table 38 in order from the left side in FIG. 4. Reference numeral 43 in FIG. 4A denotes a guide rail equipped with rollers 43*a* placed along the front side edge of the working table 38. The guide rail 43 serves as a line-feeder for the wire clamp 36. Incidentally, the other machines such as the wire-stripping machine 39 and the tape binding machine, which may have known structures, will not be explained in detail here.

Figure 8:
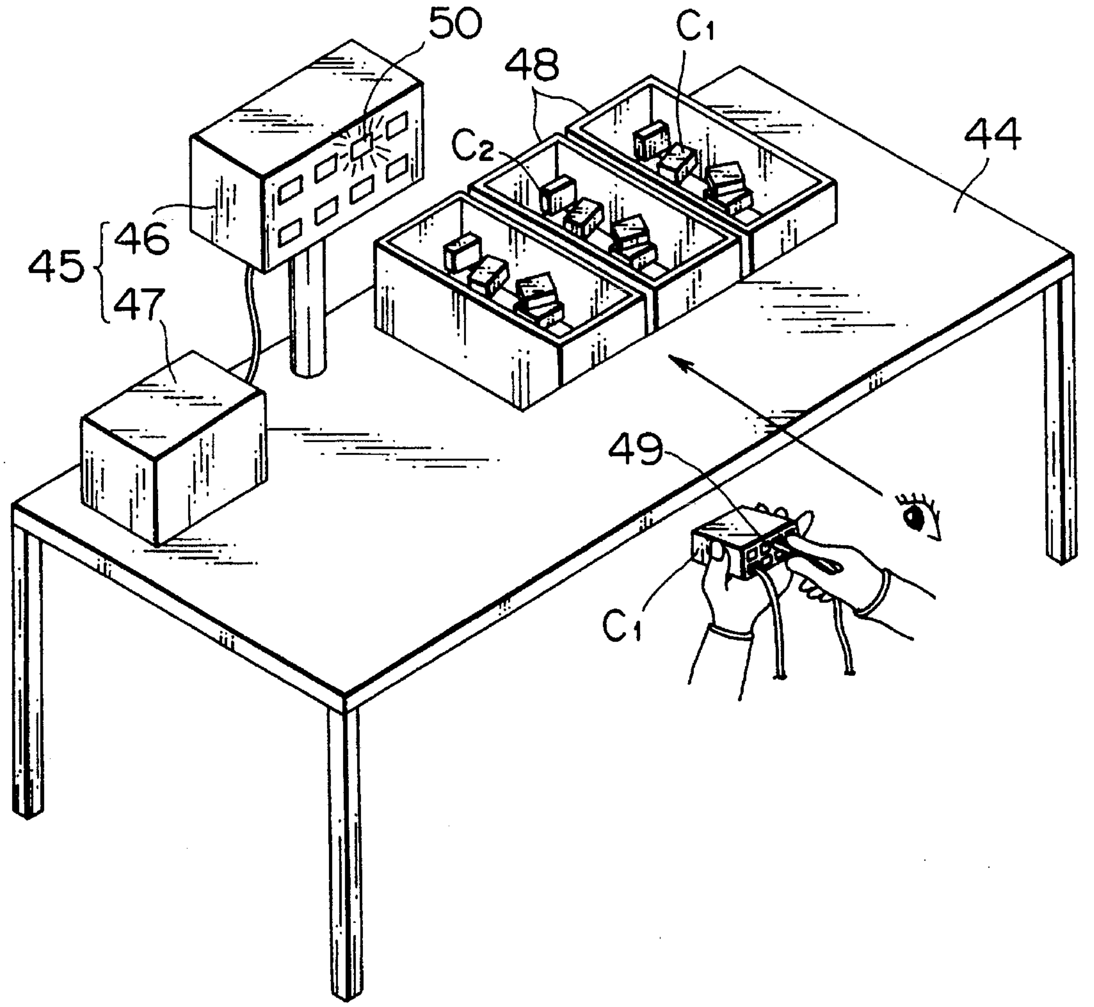
FIG. 8 is a perspective view of an induction device used in a terminal insertion process according to the present invention.

At the end of the working table 38, a terminal insertion working table 44 as shown in FIG. 8 is arranged adjacently to or separately from it. Reference numeral 45 denotes a terminal insertion induction device composed of a display 46 and a control board 47. The display 46 has blinking display means 50 using a polarizer plate on which the insertion order of terminals corresponding to plural terminal chambers 49 in a connector (or connector housing) is shown. Reference numeral 48 denotes each connector housing box.

An explanation will be given of the wire end terminal processing process.

In the end processing station S2 in FIG. 4, the wire clamp 36 (wiring harness set) having experienced the wire arrangement placed on the pole truck 35 is mounted on the guide rail 43 in front of the working table 38. To this wiring harness set, as described above, the one-end-terminal equipped wires w2, w3, w5, w6 . . . (FIG. 22) and terminal-free wires w4 other than the both-end-terminal equipped wire wl are locked in a predetermined arrangement order corresponding to the order of the subsequent end processing and terminal insertion.

Figure 22:
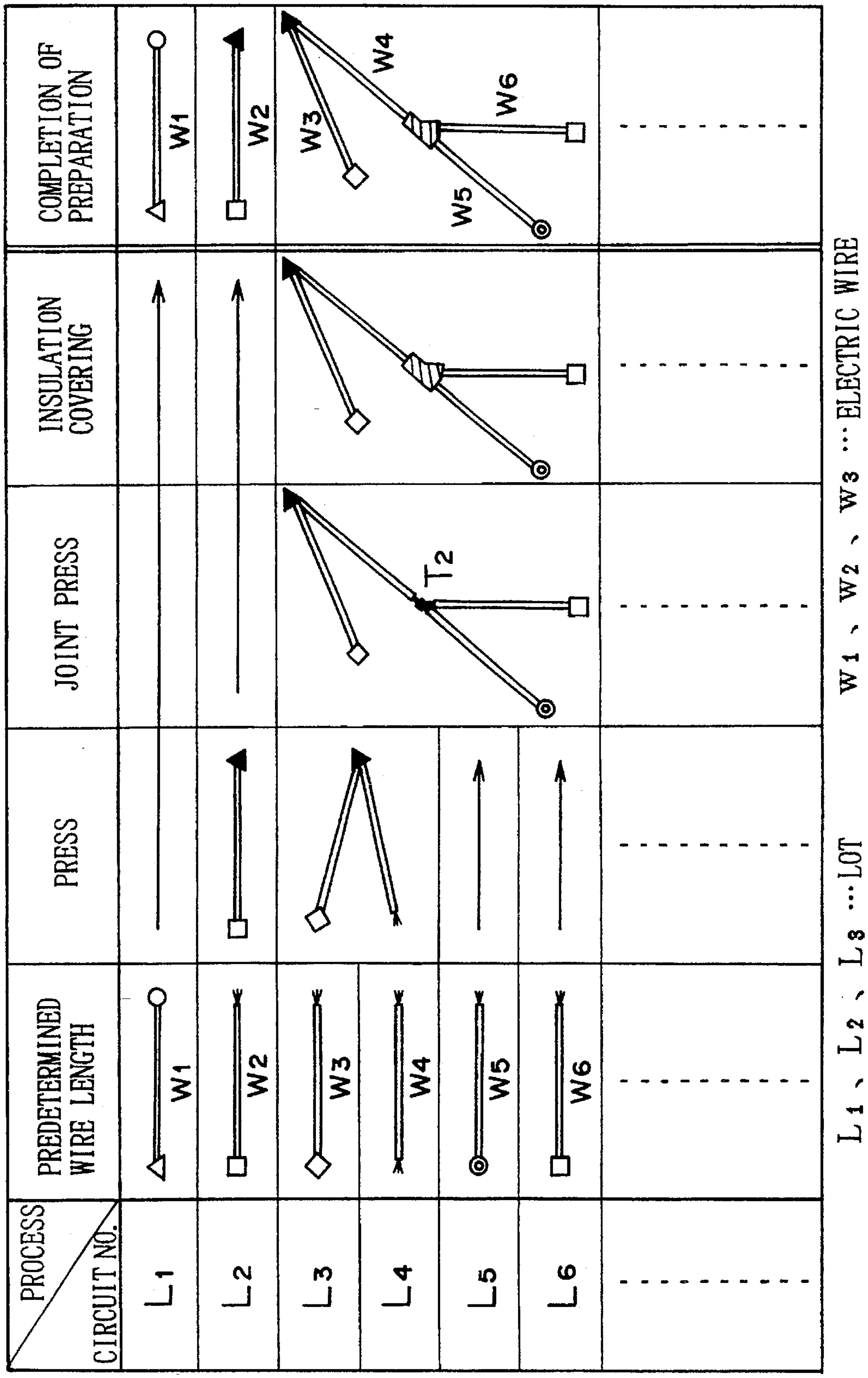
FIG. 22 is a table showing concrete examples of each of the processes in the wiring harness manufacturing process of FIG. 21.
Figure 23A:
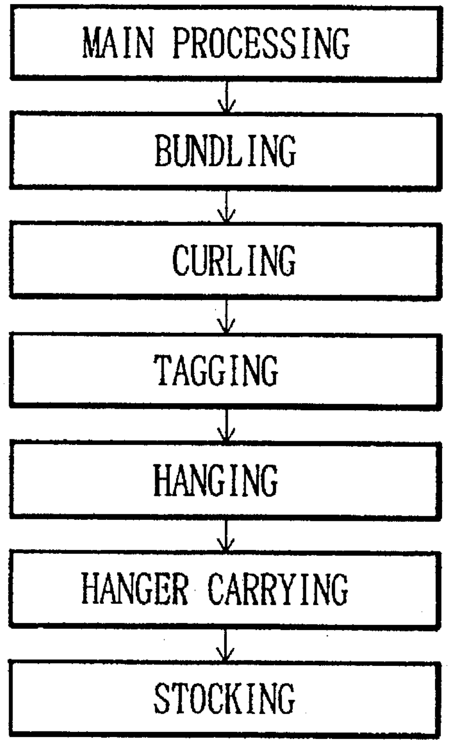
FIG. 23A PRIOR ART
FIGS. 23A and 23B are flowcharts showing the conventional process for fabricating predetermined length wires and concrete operations in the wire press process.
Figure 23B:
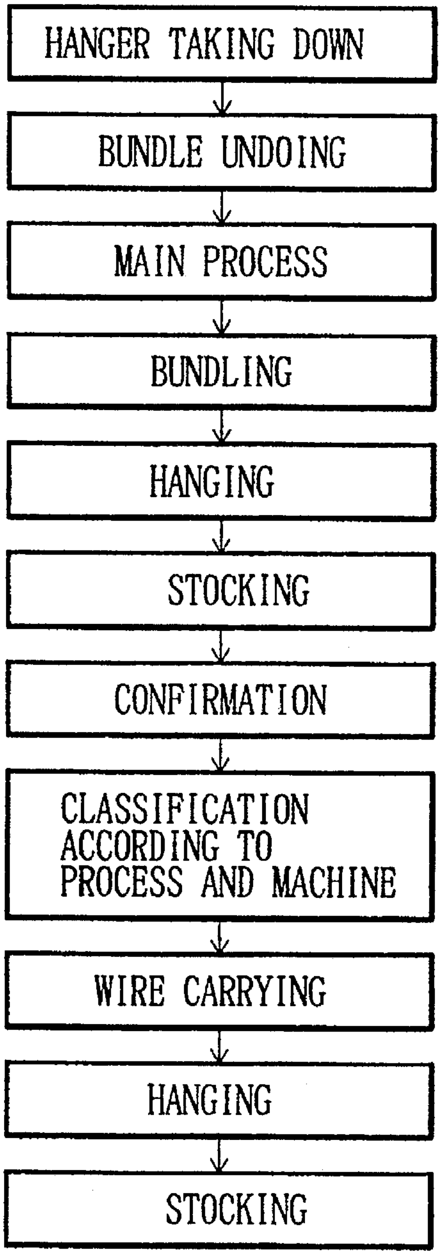
FIG. 23B PRIOR ART

Referring to FIG. 22, a worker (not shown) takes off the one-end-terminal equipped wire w2 locked to the wire clip 37 (FIG. 7) of the wire clamp 36 to press a terminal to it. After the press, the wire is returned to the original wire clip 37. If the other end of the one-end-terminal equipped is not stripped, it is previously stripped using the wire-stripping machine 39.

In the same way, the worker takes off the one-end-terminal equipped wire w3 and the terminal-free w4 from the wire clip portion 37 and subjects them to double crimping, using an adjacent terminal crimping machine 40-2.

Further, the worker slightly shifts the double-connected wires w3 and w4 to a joint press 41. The worker also shifts the wire clamp 36 along the guide rail 43, and takes off the other one-end-terminal equipped wires w5 and w6 from the wire clip 37 to crimping the joint terminal T2 to the one (w4) of the double-crimped wires using the joint crimp 41.

After the jointing, another worker solders the above joint portion using a soldering device (not shown) provided between the joint press 41 and the tape binding device 42. Finally, the worker binds the soldered portion, for its protection, with an insulating tape such as a vinyl tape, and locks the end of the double and joint pressure-connected wires w3-w4-w5-w6 to a predetermined wire clip portion 37.

In this way, the end processing operations such as single pressing, double crimping and joint crimping are performed by the corresponding crimping machines 40-1 and 40-2 and the joint crimping 41 so that the workers easily master these processing operations in a short time.

Figure 17:
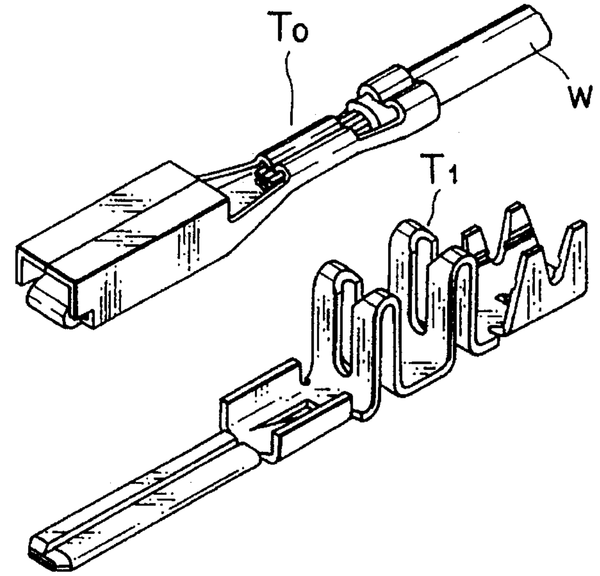
FIG. 17 PRIOR ART
FIG. 17 is perspective views of representative examples of the conventional crimping terminal and pressure-welding terminal.
Figure 18:
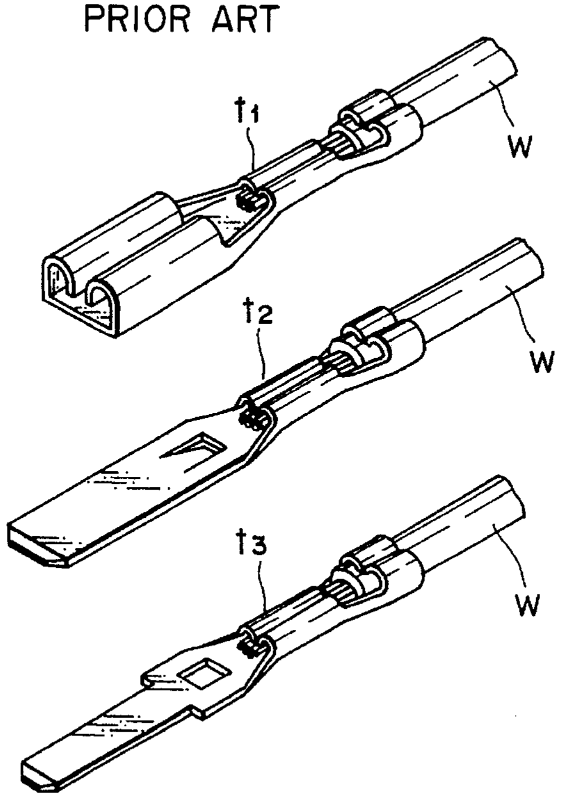
FIG. 18 PRIOR ART
FIG. 18 is perspective views of other examples of the conventional crimping terminal.
Figure 19:
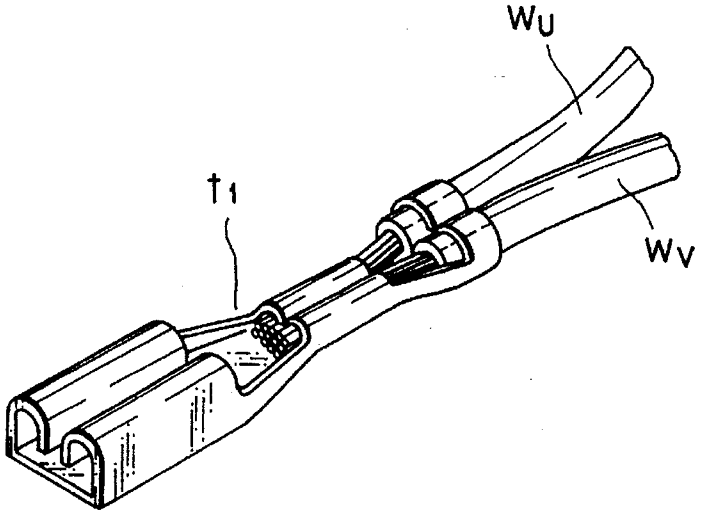
FIG. 19 PRIOR ART
FIG. 19 is a perspective view of an example of the conventional double crimping terminal.
Figure 20:
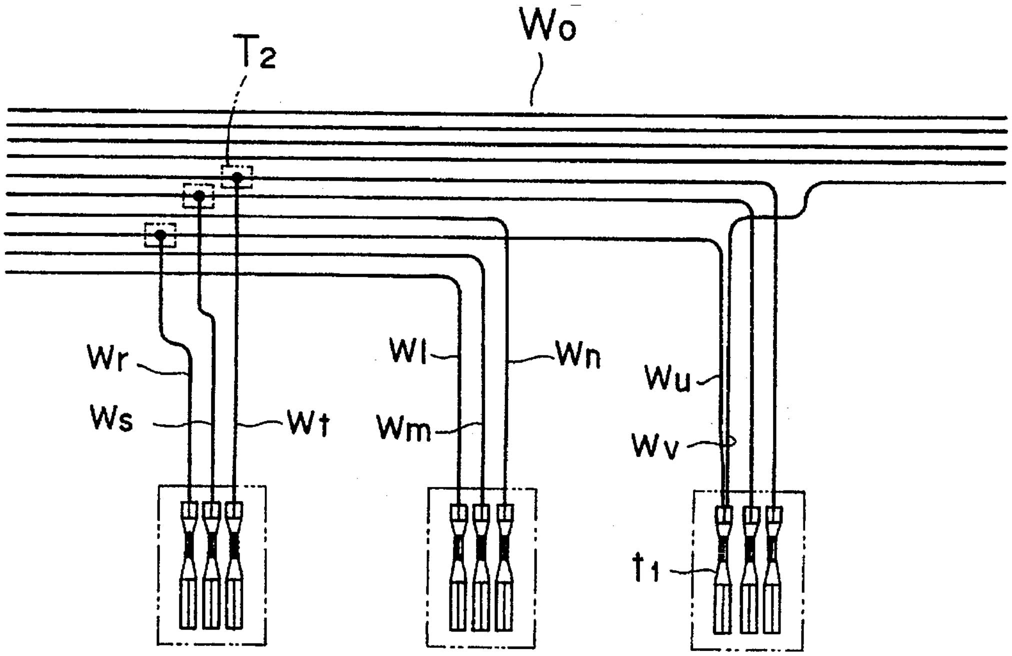
FIG. 20 is a view for explaining the state of the branch portion for the trunk portion of a wiring harness.

The above description is the case where a single wire clamp 36 is shifted by the guide rail 43, two workers perform the single crimping, double crimping and joint crimping, and the soldering and tape binding, respectively. Up to three workers may perform these operations. Further, all the connections of terminals with wires may be accomplished through welding such as pressure-welding (FIG. 17) and radiation of laser rays instead of crimping.

The wire clamp 36 is further fed in the direction of an arrow R. The wires still not processed are successively subjected to the end processing in the same manner as described. In this way, all the end processing of wires required for the set of wires can be performed on a single line.

As the case may be, prior to the single crimping and double crimping or joint crimping, in the end processing station S2, as necessity requires, the following preliminary processing for waterproofing and protection may be made.

Specifically, desired wires are taken out from the group of one-end terminal equipped wires or the terminal-free wires to carry out rubber stopper setting processing of setting a waterproofing stopper to the wire end for a waterproofing connector or tube setting processing for attaching a protection tube to the end of one or a plurality of wires.

Figure 9A:
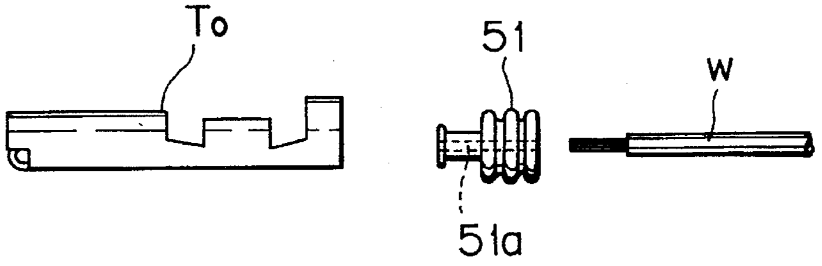
FIGS. 9A and 9B are before and after side views, respectively, of a rubber stopper used as a waterproofing connector being pressure-connected to a terminal.
Figure 9B:
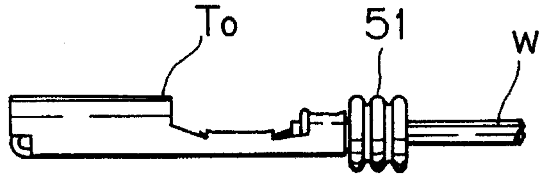
Figure 10:
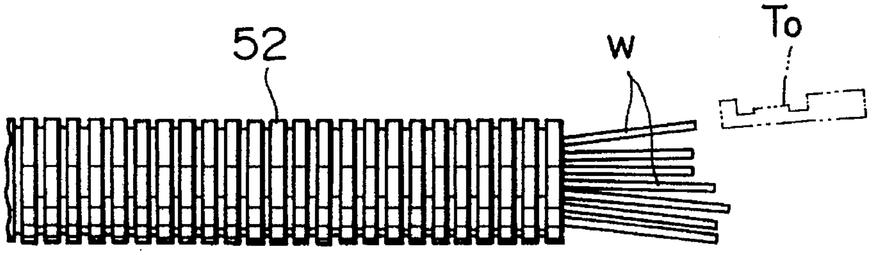
FIG. 10 is a sectional view of a protecting tube.

FIGS. 9A and 9B show an example in which a rubber stopper 51 has a single wire-through-hole 51*a* and the rubber stopper 51 and the wire w inserted thereinto are pressed to the terminal TO. The rubber stopper may have plural wire insertion through-holes. The protection tube may be not only a linear shaped-tube but also a bellow-shaped tube 52 as shown in FIG. 10. It should be noted that a uni-pole connector having only a single terminal may be subjected to the terminal insertion process.

An explanation will be given of the terminal insertion process. The wiring harness set having been subjected to all the end processing operations in the end processing station S2 is placed on a truck similar to the pole truck. The wiring harness set is carried to the side of the terminal insertion working table 44 shown in FIG. 8. Since the wires to be subjected to the terminal insertion are locked to the wire clamp 36 in a predetermined order as described above, a worker takes out the locked wire ends, e.g. from the one end of the wire clamping to the other end thereof, or from the center portion thereof to the right or left end thereof. The worker successively inserts the terminals of the wire ends into the terminal chambers and locks them.

First, when the first connector C1 is taken from the connector housing 48 and the terminal insertion induction device 45 is operated, the position of the terminal housing 49 in which the terminal is to be inserted is rightly displayed on the display 46 by the blinking display means 50. When the terminals are inserted in accordance with the blinking instruction, they are housed individually in predetermined chambers of a predetermined connector. Likewise, the end terminals are inserted into corresponding connectors. Thus, the erroneous selection or insertion of the terminals can be prevented.

The wiring harness set having been subjected to the terminal insertion is combined with another kind of wiring harness set, in accordance with the scale (the number of circuits) of the wiring harness or others as necessity arises, and thereafter the sets thus combined are shifted to the final process. Incidentally, in the terminal insertion step, as the case may be, the respective wire terminals from two wiring harness sets may be inserted into the same connector.

In the final process, a group of wires of the single or combined wiring harness sets are arranged two-dimensionally on a wiring harness board so as to accord with the wiring format of a wiring harness, and the final process operations such as converging, branching and tape binding of wires for maintaining the wiring format are carried out to make a complete wiring harness.

Figure 11:
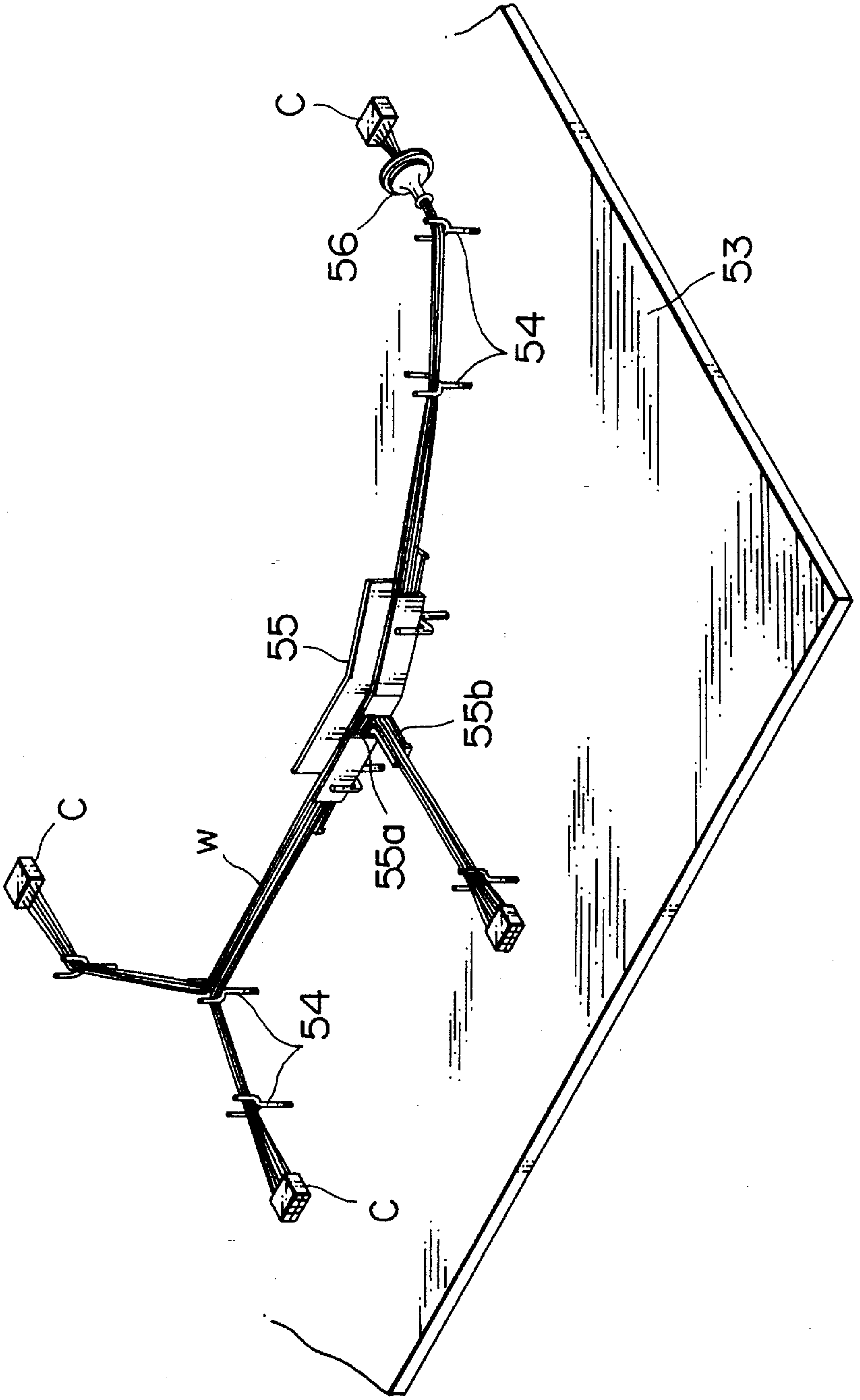
FIG. 11 is a perspective view for explaining the final processing of a wiring harness.

In arranging groups of wires two-dimensionally, as shown in FIG. 11, a plurality of locking pins 54 are previously arranged on a wiring harness board 53. The groups of the wires w (w1, w2, w3, w4, w5, . . .) are shaped in accordance with the arrangement format of a wiring harness while they are locked to the wire locking pins 54. In order to maintain the group of wires in the arrangement format of the wiring harness, they are converged and fixed in such a manner that a wire protector 55 having the corresponding shape is affixed to the main part, particularly, branching portion of the wire bundle shaped by the wire locking pins 54. In FIG. 11, reference numeral 55*a* denotes a recess for extracting the branching portion and 55*b* denotes a piece for supporting it.

Figure 15:
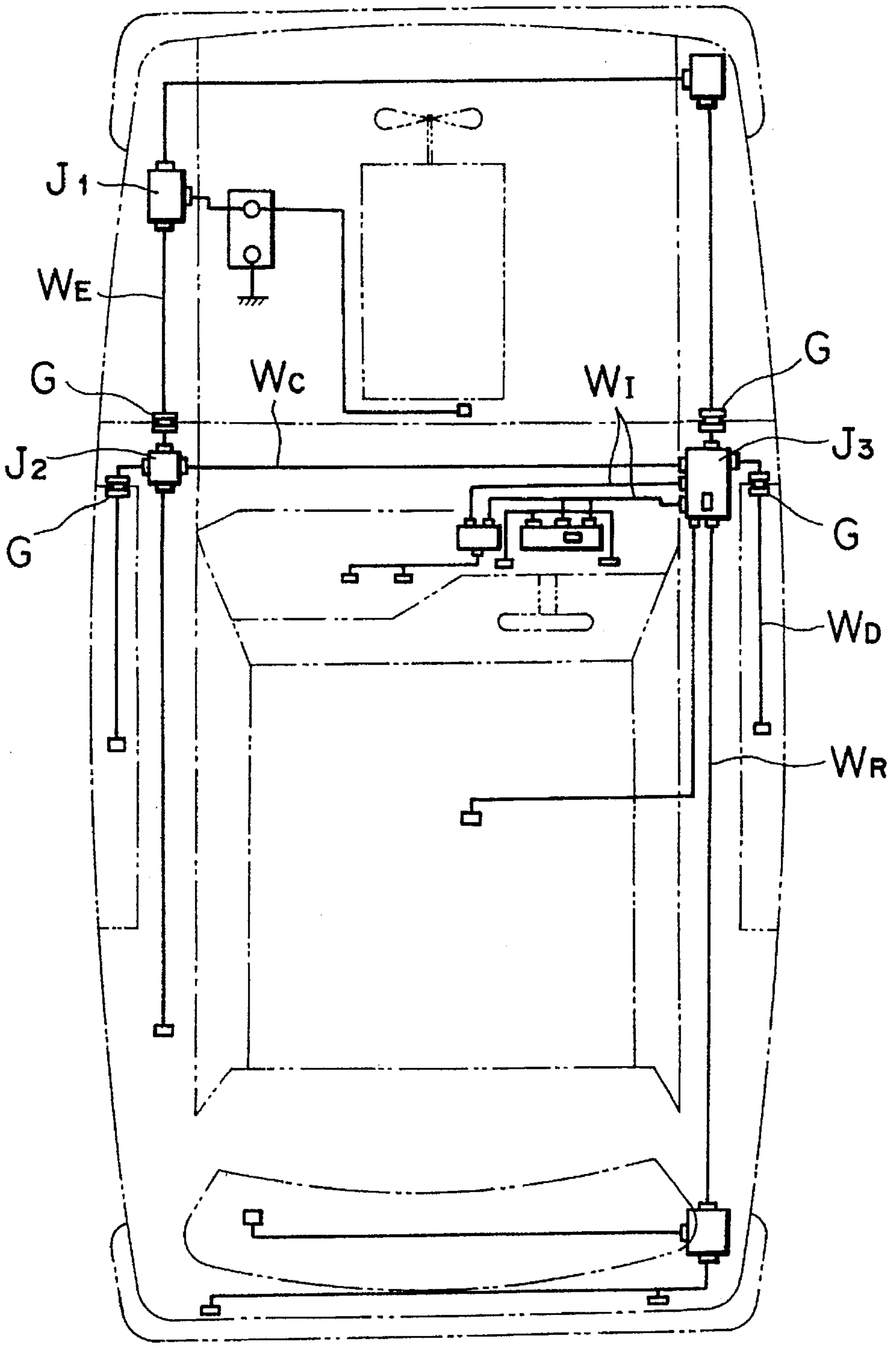
F I G. 1 5 PRIOR ART
FIG. 15 is a plan view of one example of the conventional arrangement format of wiring harnesses in a motor vehicle.
Figure 16:
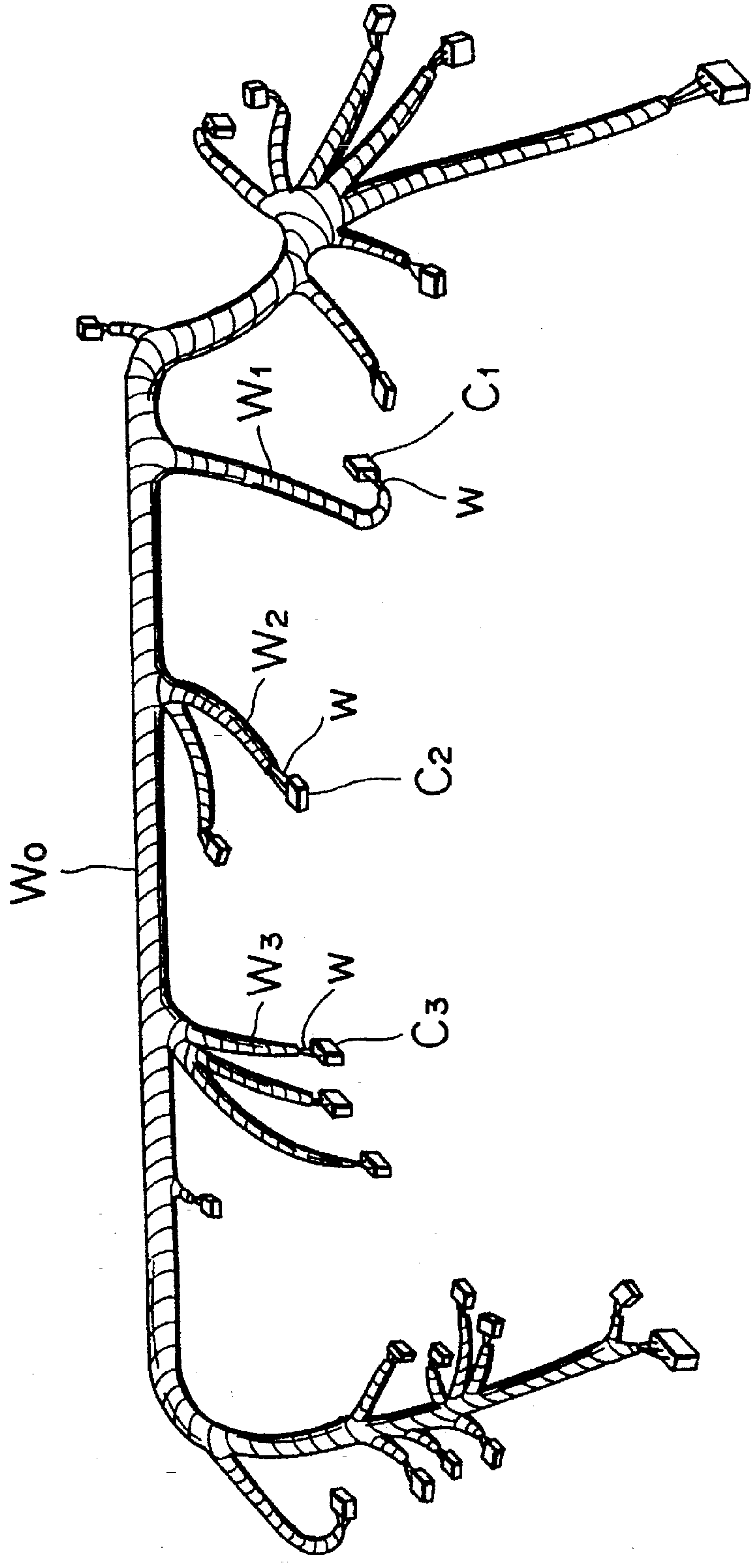
FIG. 16 PRIOR ART
FIG. 16 is a perspective view of one example of the conventional instrument panel wiring harness.

Further, the engine room wiring harness WE and door wiring harness WD as shown in FIG. 15 are furnished with a grommet 56 used when they are placed in through-holes of a dash board, a panel, etc.

Figure 12:
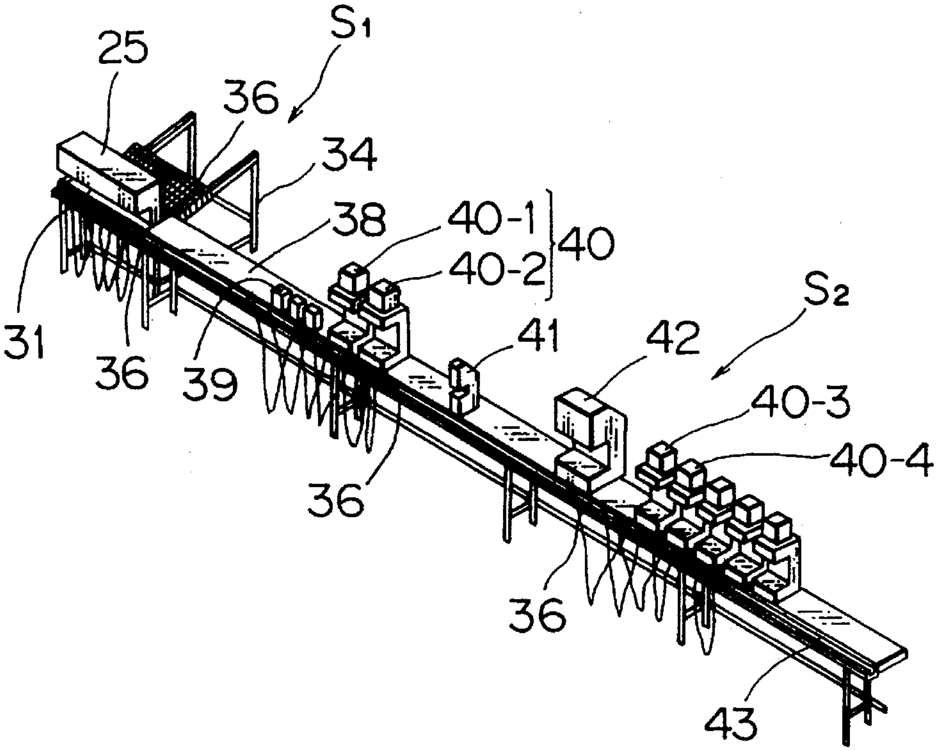
FIG. 12 is a schematic perspective view of another example of the manufacturing line of a wiring harness according to the present invention.

FIG. 12 is a schematic perspective view showing another example of the manufacturing line of the wiring harness according to the present invention. This example, in which the wire arrangement station S1 and the end processing S2 are successively provided, intends to eliminate a leading time between the wire arrangement processing and the wire end processing to improve the productivity of wiring harnesses.

Figure 13:
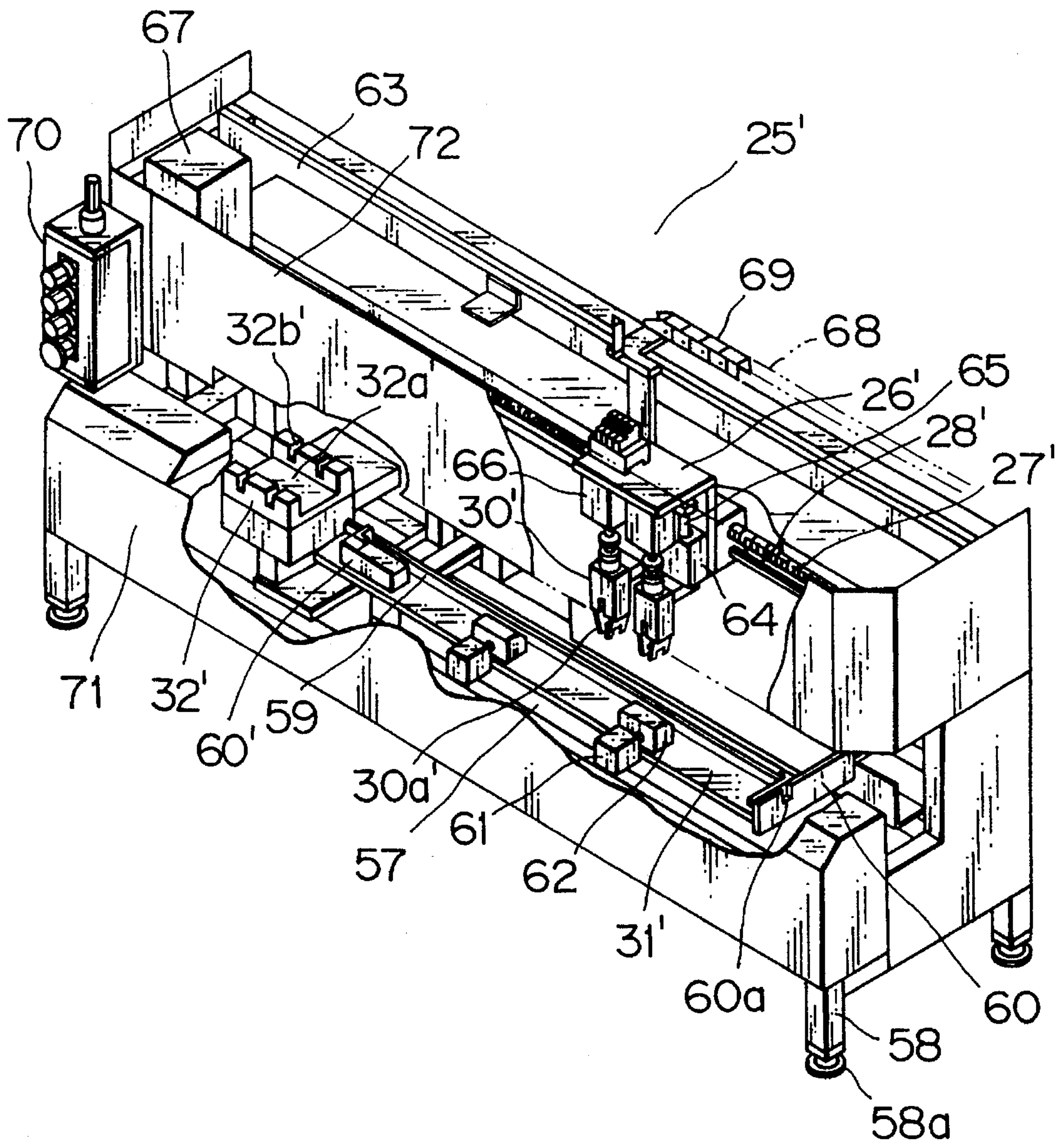
FIG. 13 is a schematic perspective view of another embodiment of the automatic wire arrangement device according to the present invention.
Figure 14:
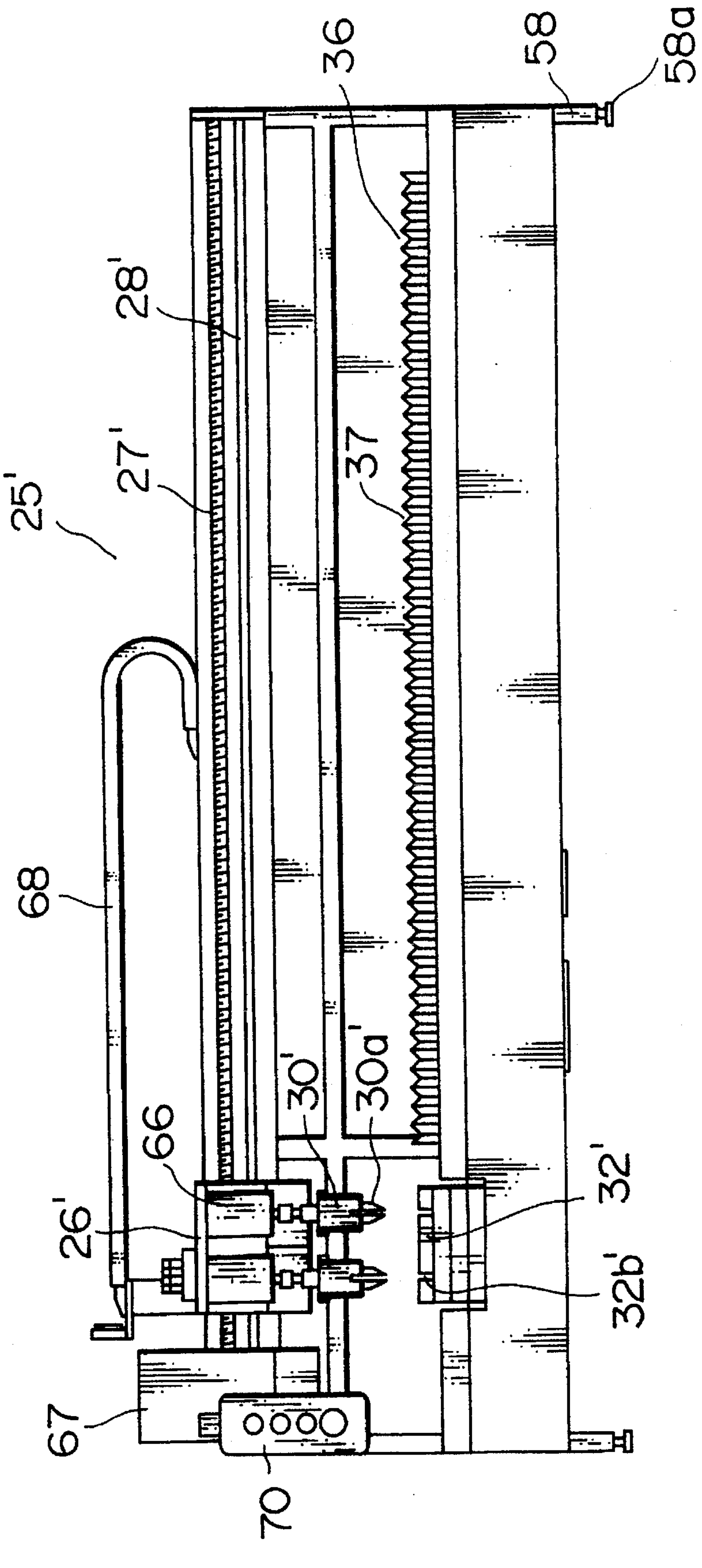
FIG. 14 is a front view of FIG. 13.

FIG. 13 is a schematic perspective view of another embodiment of the automatic wire arrangement apparatus, and FIG. 14 is its front view. In FIG. 13, like reference numerals with a dash denote like members in FIG. 7.

As seen from FIG. 13, an automatic wire arrangement device 25' includes a rectangular stand 57, an arrangement work table 31' fixed at its upper central portion and four legs 58 each with an adjuster **58*a* provided at its four corners. The work table 31' includes a plate 59 for receiving the pole-shape wire clamp 36 and pushers 62 which advance or retreat for the receiving plate 59 by cylinders 61 together with stoppers 60, 60' at both ends of the receiving plate 59. The one stopper 60 has a recess groove 60*a* for making it easy to remove the wire clamp 36. The other stopper 60' is provided with a sensor (not shown) which can detect that the wire clamp 36 has been set in the work table 31'**.

On the one side (left side in FIG. 13 of the work table 31', a wire setting stand 32' having an escaping groove **32*a* and wire placing grooves 32*b*, 32*b* is provided. The wire setting stand 32', like the stopper 60', has a sensor (not shown) which can detect that a wire has been set. The detected signal operates an attaching head 26'** described later.

As described previously, the automatic wire arrangement apparatus 25' is provided with a pair of wire insertion chucks 30' which can freely move vertically and horizontally for the arrangement work table 31'.

Specifically, each of the wire insertion chucks 30' is fixed to a holder lot and has a pair of wire chucking plates **30*a'*, each of which can be freely opened/closed. The holder 64 is so provided that it is slidable for the attaching head 26' by a guide rod 65. The attaching head 26' has a cylinder 66 for rise/fall of the wire insertion chuck 30' is mounted to a screw rod 27' and a guide rod 28' which are hung between both ends of a rear frame 63 of the stand 57**.

In FIG. 13, reference numeral 67 denotes a motor for revolving the screw rod 27' clockwise or counter-clockwise; 68 lead wires; 69 their cover; 70 a switch box; and 71, 72 safety covers.

The wire arrangement by the automatic arrangement apparatus 25' is carried out as follows:

(1) A worker sets the wire clamp 36 between the receiving plate 59 and the pusher 62 on the work on the arrangement work table 31'. Thus, the sensor of one stopper 60' detects the fact to operate the cylinder 61. Then, the pusher 62 pushes the wire clamp 36 to be sandwiched between it and the receiving plate 59.

(2) As described in connection with the automatic wire arrangement device 25 shown in FIG. 7, the worker successively takes out predetermined wires (w1, w2, . . .) from the wire holders (H1, H2, . . .) and places one or both ends in the wire placing groove **32*b'*** of the wire setting stand.

(3) When the sensor on the wire setting stand 32' detects that a wire has been set, the attaching head 26' moves on top of the wire setting stand 32' owing to the revolution of the motor 67. Then, the wire insertion chuck 30' lowers by the operation of the cylinder 66 and grasps the placed wire using the chucking plates **30*a'*, 30*a'*** through the opening/closing mechanism having a known arrangement.

(4) The wire insertion chuck 30' rises and the attaching head 26' moves to a previously programmed position of a prescribed wire clip 37 so that the wire is locked to the position. In this case, since the distance between a pair of wire insertion chucks 30' and 30' is fixed, there are the cases where the insertion chucks 30' lock the both ends of the wire simultaneously and where after the insertion chuck 30' once locks the one end, it rises and moves to lock the remaining end.

(5) The processes of (2)–(4) are repeated. When the programmed number of times of operations are completed, the pusher 62 of the cylinder 61 retreats to release the wire clamp 36.

(6) The wire clamp 36 with the wires set is taken out from the work table 31'.

The processes of the above (1) to (6) will be successively repeated.

The automatic wire arrangement apparatus 25' is so structured that the sensor detects that the wire clamp 36 has been fixed in the work table 31' and a wire has been placed on the wire setting stand 32' and the attaching head 26' successively moves to the predetermined wire clips 37 to lock the wires. The worker, therefore, has only to successively take out the predetermined wires w1, w2, . . . in accordance with the opening/closing operation of the caps 22 of the wire holders H1, H2, . . . shown in FIG. 6 to place them on the wire setting stand 32'. Thus, the wiring harness set with no erroneous wiring can be manufactured.

Further, since the automatic wire arrangement apparatus 25' is constructed as an individual apparatus provided with the attaching head 26' and the wire insertion chuck 30' on the stand 57 equipped with adjusters **58*a*, it can be applied to the manufacturing line as shown in FIG. 12**.

As described above, in accordance with the method of manufacturing a wiring harness using a wiring harness set according to the present invention, the following effects can be obtained:

(1) All the respective processes, from making predetermined length wires to terminal insertion, substantially make up only the wire processing. The redundant operations associated with the conventional batch system can be almost totally eliminated so that the time and labor can be greatly reduced.

(2) Since there is a very little stock of wires between the respective processes from making predetermined length wires to terminal insertion, the lead time can be shortened.

(3) After the processes of making predetermined length wires and of wire arrangement have been completed, several kinds of end processing are successively carried out on a single end processing station. A worker, therefore, can easily understand all the processes and so master them in a short period.

(4) The end processing is carried out on the above single line (end processing station), the carrying process according to the conventional batch system is not required. For this reason, the generation of problems such as intertwining and trampling of terminals can be greatly reduced so that the generation rate of inferior goods can be suppressed.

(5) Since the wire end processing such as single pressing, double pressing and joint pressing is carried out exclusively on a single line, quality control can be easily made.

(6) Since the electric wires constituting a wiring harness are locked at predetermined positions of the wire clamp until the process of terminal insertion after the wire arrangement, they can be easily visually managed.

(7) Because of the above effects of (1) to (6), generally, the wiring harness of the present invention have a high level of quality equal to that of the wiring harness manufactured by an automated device.

(8) Since the entire manufacturing device can be composed of known devices or machines for making predetermined length wires, wire-stopping, terminal press, joint press, etc., it can be prepared at lower cost than the complete automation apparatus from making predetermined length wires to terminal insertion and contributes to reduction in the production cost of wiring harnesses.

In accordance with the apparatus for manufacturing a wiring harness according to the present invention, if both ends or one end of the wires are placed on the wire setting stand after the wire clamp is fixed on the wire arrangement work table, the wire insertion chuck successively locks the wires in a predetermined order to the wire clips of the wire clamp. Thus, the set of wires with no false wiring and stable quality can be manufactured.

We claim:

1. A method of manufacturing a wiring harness using a set of wires therefor, comprising the steps of:

making plural kinds of electric wires each having a predetermined length for each said kind of wire in lots, each said lot having a plurality of wires, the plural kinds of wires forming a wiring harness and including both terminal-equipped wires having either one or both ends connected with a terminal, and terminal-free wires;

temporarily holding groups of said wires in predetermined wire holders; and a wire-arrangement step, comprising the steps of forming a set of wires for the wiring harness with the groups of wires constituting the wiring harness laid out on one or more wire clamps in such a manner that one of the wires is taken out from one of the wire holders to secure one or both of its ends to predetermined one or two wire clips of the wire clamp provided with plural wire clips, and subsequently taking out, one-by-one, the wires from each of the wire holders to secure one or both ends of each said wire to one or two wire clips separately provided.

2. A method of manufacturing a wiring harness according to claim 1, wherein said wire clamp comprises a plurality of wire clips supported and fixed in parallel by a linear supporting rod.

3. A method of manufacturing a wiring harness according to claim 1 or 2 further comprising the step of:

wire-end processing in which the wiring harness set formed by said wire arrangement process is shifted to a predetermined end processing station, the remaining one-end terminal equipped wires or terminal-free wires are subjected to the desired end processing such as terminal crimping and joint crimping, and after the processing, their wire ends are returned to original wire clipping positions and locked there.

4. A method of manufacturing a wiring harness according to claim 3, wherein said desired end processing comprises at least one of the following steps:

a rubber stopper setting step, comprising the steps of taking out wires selected from a first group of wires with one or both ends of each wire with no terminal set in the wiring harness and setting each end of each wire into a water proof rubber stopper;

a tube insertion step, comprising the step of taking out wires selected from a second group of wires with one or both ends of each wire with no terminal set in the wiring harness and inserting the end of one or plural wires into a protecting tube;

a terminal connection step, comprising the steps of taking out wires with one or both ends of each wire with no terminal inclusive of the wires mounted into the rubber stopper or tube and fixedly connecting the wires to predetermined terminals;

a terminal double connection step, comprising the steps of taking out, from the wiring harness set, two or more wires with no terminal doubly secured to the wiring clip and doubly fixedly connecting the two or more wires to predetermined terminals;

a joint connection step, comprising the steps of taking out, from the wiring harness set, a set of wires with their one end with no terminal and other wires and connecting, in a branching manner, the middle or end portion of each of the other wires to each of the wires with their one end with no terminal;

a soldering processing step, comprising the steps of taking out, from the wiring harness set, the joint-connected or terminal-equipped wires and soldering the joint-connected portion or the terminal-wire connected portion; and an insulation-covering step, comprising the steps of protecting the soldered portion by binding the soldered portion with an insulating tape.

5. A method of manufacturing a wiring harness according to claim 4, wherein said end processing station includes a guide rail for successively shifting said wire clamp to the subsequent process.

6. A method of manufacturing a wiring harness according to claim 3, further comprising the step of:

terminal insertion consisting of detaching the wire ends in a predetermined order from the wiring harness set subjected to the wire end processing to insert the fixedly connected terminals into terminal chambers of the first connector housing and repeating the operation of inserting the terminals into successive connector housings.

7. A method of manufacturing a wiring harness according to claim 6, further comprising the step of:

combining wiring harness sets consisting of plural wiring harness sets subjected to the terminal insertion to prepare all wires necessary for a single wiring harness.

8. A method of manufacturing a wiring harness according to claim 7, further comprising the step of:

final processing consisting of arranging two-dimensionally the combined plural wiring harness sets so as to accord with the wiring formal of the wiring harness on a wiring harness board and performing the final process operations including wire-gathering, branching, tape binding, wire protector attaching and grommet mounting.

9. A method of manufacturing a wiring harness using a set of wires therefor, comprising the steps of:

making plural kinds of electric wires each having a predetermined length for each said kind of wire in lots, each said lot having a plurality of wires, the plural kinds of wires forming a wiring harness and including both terminal-equipped wires having either one or both ends crimped with a terminal, and terminal-free wires;

holding groups of said wires in predetermined wire holders;

wire arrangement comprising the steps of forming a set of wires for the wiring harness with the groups of wires constituting a wiring harness hung on one or more wire clamps in such a manner that one of the wires is taken out from the one of the wire holders and bent in a U-shape, wherein both ends of said wire are secured to predetermined two wire clips of a wire clamp provided with a chain of plural wire clips, and subsequently, the wires are taken out in order one-by-one from each of the wire holders to secure both ends of said wire to two wire clips separately provided;

wire-end processing consisting of shifting said set of wires formed by said wire arrangement process to a predetermined end processing station, and comprising at least one of the following steps:

terminal crimping, comprising the steps of successively taking out a wire with one of both ends having no terminal from said set of wires or said wire clamping pole and crimping predetermined terminals to said wire and thereafter returning to original wire clipping positions so as to be secured there;

terminal double crimping comprising the steps of successively taking out, from said of wires, two wires with no terminal doubly secured to the wiring clip and doubly pressing the two wires to predetermined terminals and thereafter returning to original wire clipping positions so as to be secured there;

joint crimping, comprising the steps of successively taking out, from the wiring harness set, a group of wires with one end of some of said wires having no terminal and some of said wires having both ends with terminals and connecting, in a branching manner, each of the wires with one end having no terminal to the middle or end portion of the wire with both ends equipped with terminals and thereafter returning the end portion other than said joint-connected portion so as to be secured there;

soldering comprising the steps of successively taking out, from said wires, the joint-connected wires and soldering each of the joint-connected portions and thereafter returning the wire end portion other than said soldered portion to the original wire clipping position so as to be secured there; and tape binding consisting of insulation-protecting the soldered group of wires without taking them out from said set of wires by successively binding each of the soldered portions with an insulating tape;

terminal insertion, comprising the steps of successively detaching the wire ends from one end to the other end of said set of wires subjected to the wire end processing to successively insert the crimped terminals into terminal chambers of a predetermined connector housing and inserting them in the subsequent connector housing, and repeating such an operation; and wiring harness making comprising the steps of detaching all the wires from said set of wires, two-dimensionally arranging the wires so as to accord with the arrangement format of a wiring harness and performing a final process operation such as bundling, branching and tape binding of wires for maintaining the arrangement format.

10. A method of manufacturing a wiring harness according to claim 9, wherein the electric wires have different lengths, wire diameters, colors in their insulation cover and signs shown on the insulation cover such as a character, symbol and stripe.

11. A method of manufacturing a wiring harness according to claim 9, wherein the electric wire holders are cylindrical or bucket-shaped wire containers.

12. A method of manufacturing a wiring harness according to claim 9, wherein each of said electric wire holders is provided with an opening/closing mechanism for controlling take-out of wires.

13. A method of manufacturing a wiring harness according to claim 9, wherein said holders are formed as a wire setting truck having plural wire hanging poles corresponding to said lots.

14. A method of manufacturing a wiring harness according to claim 9, wherein said wiring clamp is composed of a plurality of electric wire clips supported and fixed in parallel at regular intervals by a linear supporting bar.

15. A method of manufacturing a wiring harness according to claim 9, wherein the securing operation for the wire clips is carried out manually.

16. A method of manufacturing a wiring harness according to claim 9, wherein the securing operation for the wire clips is carried out automatically by a securing device provided with wire insertion chucks which can be moved vertically and horizontally.

17. A method of manufacturing a wiring harness according to claim 9, wherein said wiring clamp is composed of a plurality of electric wire clips supported and fixed in parallel at regular intervals by an arc-shaped supporting bar.

18. A method of manufacturing a wiring harness according to claim 9, wherein said end processing station is provided with a roller-equipped guide rail for successively shifting said wire clamp.

19. A method of manufacturing a wiring harness according to claim 9, wherein said rubber stopper has a single wire through-hole.

20. A method of manufacturing a wiring harness according to claim 9, wherein said rubber stopper has plural wire throughholes.

21. A method of manufacturing a wiring harness according to claim 9, wherein said waterproofing tube has a bellows shape.

22. A method of manufacturing a wiring harness according to claim 9, wherein a pressure-welding terminal having a slot for introducing a wire by pressure is used to connect or fix a terminal to a wire.

23. A method of manufacturing a wiring harness according to claim 9, wherein a press terminal having a wire barrel is used to connect or fix a terminal to one of said wires.

24. A method of manufacturing a wiring harness according to claim 9, wherein a crimping terminal having a wire barrel is used to connect or fix a terminal to said two wires.

25. A method of manufacturing a wiring harness according to claim 9, wherein a crimping terminal having a wire barrel is used for said group of wires.

* * * * *